United States Patent
Dunn

(10) Patent No.: US 12,435,158 B2
(45) Date of Patent: Oct. 7, 2025

(54) ANTI-LAMBDA MYELOMA ANTIGEN (LMA) BINDING PROTEINS TO TREAT LMA-EXPRESSING CANCER AND AUTOIMMUNE DISORDERS

(71) Applicant: HaemaLogiX, Sydney (AU)

(72) Inventor: Rosanne Dunn, Sydney (AU)

(73) Assignee: HAEMALOGIX LTD, Sydney (AU)

( * ) Notice: Subject to any disclaimer, the term of this patent is extended or adjusted under 35 U.S.C. 154(b) by 417 days.

(21) Appl. No.: 17/819,483

(22) Filed: Aug. 12, 2022

(65) Prior Publication Data

US 2023/0174675 A1  Jun. 8, 2023

Related U.S. Application Data

(62) Division of application No. 16/970,991, filed as application No. PCT/AU2019/050137 on Feb. 20, 2019, now Pat. No. 11,447,571.

(30) Foreign Application Priority Data

Feb. 20, 2018 (AU) .................................. 2018900534

(51) Int. Cl.
C07K 16/00 (2006.01)
A61P 35/00 (2006.01)
C07K 16/42 (2006.01)

(52) U.S. Cl.
CPC .............. *C07K 16/42* (2013.01); *A61P 35/00* (2018.01); *C07K 2317/21* (2013.01); *C07K 2317/33* (2013.01); *C07K 2317/524* (2013.01); *C07K 2317/526* (2013.01); *C07K 2317/565* (2013.01); *C07K 2317/622* (2013.01); *C07K 2317/732* (2013.01); *C07K 2317/734* (2013.01); *C07K 2317/76* (2013.01); *C07K 2317/92* (2013.01)

(58) Field of Classification Search
CPC ............... C07K 16/42; C07K 2317/21; C07K 2317/33; C07K 2317/565; C07K 2317/622
See application file for complete search history.

(56) References Cited

FOREIGN PATENT DOCUMENTS

| WO | 2005/082409 A1 | 9/2005 |
| WO | 2010/088388 A1 | 8/2010 |
| WO | 2010/115238 A1 | 10/2010 |
| WO | 2013/132245 A1 | 9/2013 |

OTHER PUBLICATIONS

Asvadi, P. et al "Identification and Characterisation of Lambda Myeloma Antigen, LMA, as a Therapeutic Target in Lambda Multiple Myeloma" Haematologica, vol. 98, Supp. 1, p. 316, Abstract 756.

*Primary Examiner* — Lei Yao
(74) *Attorney, Agent, or Firm* — FOX ROTHSCHILD LLP

(57) ABSTRACT

The present disclosure relates to anti-LMA binding proteins. Such binding proteins may be useful for treating disorders associated with aberrant proliferation of plasma cells and/or their precursors.

6 Claims, 12 Drawing Sheets

Figure 1:
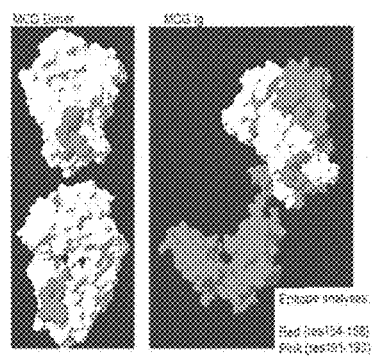

Specification includes a Sequence Listing.

```
7F11    MEFGLSWLFLVAILKGVQCEVQLLESGGGLVQPGGSLRLSCAASGFTFSSYAMSWVRQAP
10B3    MELGLRWVFLVAILEGVQCEVQLVESGGGLVKPGGSLRLSCAASGFTFSSYSMNWVRQAP
18E11   MELGLRWVFLVAILEGVQCEVQLVESGGGLVKPGGSLRLSCAASGFTFSSYSMNWVRQAP
18E8    MELGLRWVFLVAILEGVQCEVQLVESGGGLVKPGGSLKLSCAASGFTFSSYSMNWVRQAP
        ** ** * ****** ******* ****** ***** ************** * ******

7F11    GKGLEWVSAINNSGGSTYYADSVKGRFTISRDNSKNTLYLQMNSLRAEDTAVYYCAKDQG
10B3    GKGLEWVSFISSNRNYIYYADSVKGRFTISRDNAKNSLYLQMNSLRAEDTAVYYCASLAN
18E11   GKGLEWVSFISSNRNYIYYADSVKGRFTISRDNAKNSLYLQMNSLRAEDTAVYYCASLAN
18E8    GKGLEWVSFISSWSNYIYYADSVKGRFTISRDNAKNSLYLQMNSLRAEDTAVYYCASLAN
        ******** *          ************* ** ***********************

7F11    WGPLNWFDPWGQGTLVTVSSASTKGPSVFPLAPSSKSTSGGTAALGCLVKDYFPEPVTVS
10B3    WGT---YFDYWGQGTLVTVSSASTKGPSVFPLAPSSKSTSGGTAALGCLVKDYFPEPVTVS
18E11   WGT---YFDYWGQGTLVTVSSASTKGPSVFPLAPSSKSTSGGTAALGCLVKDYFPEPVTVS
18E8    WGT---YFDCWGQGTLVTVSSASTKGPSVFPLAPSSKSTSGGTAALGCLVKDYFPEPVTVS
        **     ** ***************************************************

7F11    WNSGALTSGVHTFPAVLQSSGLYSLSSVVTVPSSSLGTQTYICNVNHKPSNTKVDKRVEP
10B3    WNSGALTSGVHTFPAVLQSSGLYSLSSVVTVPSSSLGTQTYICNVNHKPSNTKVDKRVEP
18E11   WNSGALTSGVHTFPAVLQSSGLYSLSSVVTVPSSSLGTQTYICNVNHKPSNTKVDKRVEP
18E8    WNSGALTSGVHTFPAVLQSSGLYSLSSVVTVPSSSLGTQTYICNVNHKPSNTKVDKRVEP
        ************************************************************

7F11    KSCDKTHTCPPCPAPELLGGPSVFLFPPKPKDTLMISRTPEVTCVVVDVSHEDPEVKFNW
10B3    KSCDKTHTCPPCPAPELLGGPSVFLFPPKPKDTLMISRTPEVTCVVVDVSHEDPEVKFNW
18E11   KSCDKTHTCPPCPAPELLGGPSVFLFPPKPKDTLMISRTPEVTCVVVDVSHEDPEVKFNW
18E8    KSCDKTHTCPPCPAPELLGGPSVFLFPPKPKDTLMISRTPEVTCVVVDVSHEDPEVKFNW
        ************************************************************

7F11    YVDGVEVHNAKTKPREEQYNSTYRVVSVLTVLHQDWLNGKEYKCKVSNKALPAPIEKTIS
10B3    YVDGVEVHNAKTKPREEQYNSTYRVVSVLTVLHQDWLNGKEYKCKVSNKALPAPIEKTIS
18E11   YVDGVEVHNAKTKPREEQYNSTYRVVSVLTVLHQDWLNGKEYKCKVSNKALPAPIEKTIS
18E8    YVDGVEVHNAKTKPREEQYNSTYRVVSVLTVLHQDWLNGKEYKCKVSNKALPAPIEKTIS
        ************************************************************

7F11    KAKGQPREPQVYTLPPSRDELTKNQVSLTCLVKGFYPSDIAVEWESNGQPENNYKTTPPV
10B3    KAKGQPREPQVYTLPPSRDELTKNQVSLTCLVKGFYPSDIAVEWESNGQPENNYKTTPPV
18E11   KAKGQPREPQVYTLPPSRDELTKNQVSLTCLVKGFYPSDIAVEWESNGQPENNYKTTPPV
18E8    KAKGQPREPQVYTLPPSRDELTKNQVSLTCLVKGFYPSDIAVEWESNGQPENNYKTTPPV
        ************************************************************

7F11    LDSDGSFFLYSKLTVDKSRWQQGNVFSCSVMHEALHNHYTQKSLSLSPGK
10B3    LDSDGSFFLYSKLTVDKSRWQQGNVFSCSVMHEALHNHYTQKSLSLSPGK
18E11   LDSDGSFFLYSKLTVDKSRWQQGNVFSCSVMHEALHNHYTQKSLSLSPGK
18E8    LDSDGSFFLYSKLTVDKSRWQQGNVFSCSVMHEALHNHYTQKSLSLSPGK
        **************************************************
```

FIG. 8

ANTI-LAMBDA MYELOMA ANTIGEN (LMA) BINDING PROTEINS TO TREAT LMA-EXPRESSING CANCER AND AUTOIMMUNE DISORDERS

CROSS-REFERENCE TO RELATED APPLICATIONS

The present application is a divisional application of U.S. application Ser. No. 16/970,991 filed Aug. 19, 2020, issued as U.S. Pat. No. 11,447,571 on Sep. 20, 2022, which is a National Stage Application under 35 U.S.C. § 371 of International Application No. PCT/AU2019/050137 filed Feb. 20, 2019, which claims priority to Australian Application No. 2018900534 filed Feb. 20, 2018, the disclosures of all of which are hereby incorporated by reference in their entireties.

FIELD OF THE INVENTION

The present disclosure relates to anti-LMA binding proteins. Such binding proteins may be useful for treating disorders associated with aberrant proliferation of plasma cells and/or their precursors.

BACKGROUND OF THE INVENTION

Aberrant proliferation of plasma cells and/or their precursors is a hallmark of various human pathologies. One example is multiple myeloma (MM), a malignancy of bone marrow plasma cells. The disease is characterized by malignant plasma cells which secrete either a lambda or lambda light chain restricted monoclonal paraprotein. Lambda restriction occurs in around 40% of myeloma patients and the expression of lambda myeloma antigen (LMA) is highly restricted to malignant effector cells. Despite recent advances in therapy, multiple myeloma remains incurable. Its clinical course is characterized by an initial response to therapy, followed by repeated relapse with eventual resistance to all forms of treatment. It is also associated with significant morbidity and disability both due to the disease itself and toxicity from available treatments.

Accordingly, new approaches for treating aberrant proliferation of plasma cells and/or their precursors are required.

SUMMARY OF THE INVENTION

When producing the human binding proteins of the present disclosure, the present inventors identified a selection of human antibodies that bind and kill LMA positive cell lines. The present inventors also identified human antibodies with heavy chain modifications that direct preferential binding to LMA (i.e. cell surface antigen) over free lambda light chain (e.g. serum antigen). Such modifications may be incorporated into various binding proteins to preferentially target cells expressing LMA. Such binding proteins may be particularly effective at mediating targeted killing of cells expressing LMA such as LMA-expressing cancer cells.

Accordingly, in a first aspect the present disclosure relates to an anti-lambda myeloma antigen (LMA) binding protein having an antigen binding domain, wherein the antigen binding domain preferentially binds LMA over free lambda light chain and comprises a heavy chain variable region ($V_H$) and a light chain variable region ($V_L$), wherein the $V_H$ comprises a complementarity determining region (CDR) 1 as shown in SEQ ID NO: 1, a CDR2 as shown in SEQ ID NO: 2 and a CDR3 as shown in SEQ ID NO: 3. In another example, the $V_H$ comprises an amino acid sequence shown in SEQ ID NO: 4. In another example, the $V_L$ comprises a CDR1 as shown in SEQ ID NO: 6, a CDR2 as shown in SEQ ID NO: 7 and a CDR3 as shown in SEQ ID NO: 8 or SEQ ID NO: 13. In another example, the $V_L$ comprises an amino acid sequence shown in SEQ ID NO: 9 or SEQ ID NO: 14. In another example, the $V_L$ comprises an amino acid sequence shown in SEQ ID NO: 9. In an example, above referenced binding proteins bind lambda isotypes 2 and 3. In an example, above referenced antibodies do not bind lambda isotype 1. In another example, the above referenced antibodies bind free lambda light chain with a $K_D$ less than $1\times10^{10}$ as measured by surface plasmon resonance (SPR). In another example, the above referenced antibodies bind free lambda light chain with a $K_D$ less than $5\times10^9$ as measured by SPR. In another example, the above referenced antibodies bind free lambda light chain with a $K_D$ less than $1\times10^9$ as measured by SPR. In another example, the above referenced antibodies bind free lambda light chain with a $K_D$ less than $5\times10^8$ as measured by SPR. In another example, the above referenced antibodies bind free lambda light chain with a $K_D$ less than $5\times10^7$ as measured by SPR.

In another example, the present disclosure encompasses an anti-LMA binding protein having an antigen binding domain, wherein the antigen binding domain binds to LMA and comprises a $V_H$ and a $V_L$, wherein:
the $V_H$ comprises a CDR1 as shown in SEQ ID NO: 31, a CDR2 as shown in SEQ ID NO: 32 and a CDR3 as shown in SEQ ID NO: 33 and the $V_L$ comprises a CDR1 as shown in SEQ ID NO: 36 or SEQ ID NO: 41, a CDR2 as shown in SEQ ID NO: 37 or SEQ ID NO: 42 and a CDR3 as shown in SEQ ID NO: 38 or SEQ ID NO: 43; or,
the $V_H$ comprises a CDR1 as shown in SEQ ID NO: 61, a CDR2 as shown in SEQ ID NO: 62 and a CDR3 as shown in SEQ ID NO: 63 and the $V_L$ comprises a CDR1 as shown in SEQ ID NO: 66 or SEQ ID NO: 71, a CDR2 as shown in SEQ ID NO: 67 or SEQ ID NO: 72 and a CDR3 as shown in SEQ ID NO: 68 or SEQ ID NO: 73. In an example, the $V_H$ comprises an amino acid sequence shown in SEQ ID NO: 34 or SEQ ID NO: 64. In another example, the $V_L$ comprises an amino acid sequence shown in any one of SEQ ID NOs: 39, 44, 69 or 74.

In another example, the present disclosure encompasses an anti-LMA binding protein having an antigen binding domain, wherein the antigen binding domain binds to LMA and comprises a heavy chain variable region ($V_H$) and a light chain variable region ($V_L$), wherein:
the $V_H$ comprises an amino acid sequence shown in SEQ ID NO: 5 and the $V_L$ comprises an amino acid sequence shown in SEQ ID NO: 10 or SEQ ID NO: 15;
the $V_H$ comprises an amino acid sequence shown in SEQ ID NO: 34 and the $V_L$ comprises an amino acid sequence shown in SEQ ID NO: 40 or SEQ ID NO: 45;
the $V_H$ comprises an amino acid sequence shown in SEQ ID NO: 65 and the $V_L$ comprises an amino acid sequence shown in SEQ ID NO: 70 or SEQ ID NO: 75.

In another example, the present disclosure encompasses an anti-LMA binding protein having an antigen binding domain, wherein the antigen binding domain binds to LMA and comprises a heavy chain variable region ($V_H$) and a light chain variable region ($V_L$), wherein:
the $V_H$ comprises CDR1, CDR2 and CDR3 from the amino acid sequence shown in SEQ ID NO: 5 and the V$_L$ comprises CDR1, CDR2 and CDR3 from the amino acid sequence shown in SEQ ID NO: 10 or SEQ ID NO: 15;

the V$_H$ comprises CDR1, CDR2 and CDR3 from the amino acid sequence shown in SEQ ID NO: 34 and the V$_L$ comprises CDR1, CDR2 and CDR3 from the amino acid sequence shown in SEQ ID NO: 40 or SEQ ID NO: 45;

the V$_H$ comprises CDR1, CDR2 and CDR3 from the amino acid sequence shown in SEQ ID NO: 65 and the V$_L$ comprises CDR1, CDR2 and CDR3 from the amino acid sequence shown in SEQ ID NO: 70 or SEQ ID NO: 75;

wherein the CDRs are assigned using Kabat.

In another example, the present disclosure encompasses an anti-LMA binding protein having an antigen binding domain, wherein the antigen binding domain binds to LMA and comprises a heavy chain variable region (V$_H$) and a light chain variable region (V$_L$), wherein:

the V$_H$ comprises CDR1, CDR2 and CDR3 from the amino acid sequence shown in SEQ ID NO: 5 and the V$_L$ comprises CDR1, CDR2 and CDR3 from the amino acid sequence shown in SEQ ID NO: 10 or SEQ ID NO: 15;

the V$_H$ comprises CDR1, CDR2 and CDR3 from the amino acid sequence shown in SEQ ID NO: 34 and the V$_L$ comprises CDR1, CDR2 and CDR3 from the amino acid sequence shown in SEQ ID NO: 40 or SEQ ID NO: 45;

the V$_H$ comprises CDR1, CDR2 and CDR3 from the amino acid sequence shown in SEQ ID NO: 65 and the V$_L$ comprises CDR1, CDR2 and CDR3 from the amino acid sequence shown in SEQ ID NO: 70 or SEQ ID NO: 75;

wherein the CDRs are assigned using IMGT.

In another example, a binding protein disclosed herein specifically binds LMA. In another example, a binding protein disclosed herein is an antibody. In an example, the antibody specifically binds LMA. In an example, the antibody is a human antibody. In an example, the V$_H$ and V$_L$ of a binding protein disclosed herein are in a single polypeptide chain. For example, the binding protein may be:

(i) a single chain Fv fragment (scFv);
(ii) a dimeric scFv (di-scFv);
(iii) a trimeric scFv (tri-scFv);
(iv) any one of (i), (ii) or (iii) linked to a constant region of an antibody, Fc or a heavy chain constant domain C$_H$2 and/or C$_H$3.

In another example, the V$_H$ and V$_L$ of a binding protein disclosed herein are in a separate polypeptide chain. For example, the binding protein may be:

(i) a diabody;
(ii) a triabody;
(iii) a tetrabody;
(iv) a Fab;
(v) a F(ab')$_2$;
(vi) a Fv;
(vii) one of (i) to (vi) linked to a constant region of an antibody, Fc or a heavy chain constant domain C$_H$2 and/or C$_H$3; or,
(viii) an intact antibody.

In another example, the present disclosure encompasses a nucleic acid encoding a binding protein disclosed herein. In another example, the present disclosure encompasses a vector comprising a nucleic acid encoding a binding protein disclosed herein. In an example, such a vector can be provided in a host cell for expression of the nucleic acid.

Accordingly, in an example, the present disclosure encompasses an isolated or recombinant cell expressing a binding protein defined herein.

In another example, the present disclosure encompasses a composition comprising a pharmaceutical carrier and either a binding protein defined herein.

In another example, the present disclosure encompasses a method of treating an LMA-expressing cancer in a subject, the method comprising administering to the subject and effective amount of a binding protein defined herein. In another example, the present disclosure encompasses use of a binding protein defined herein in the manufacture of a medicament for treating an LMA-expressing cancer. In another example, the present disclosure encompasses a binding protein defined herein for use in treating an LMA-expressing cancer. In an example, the LMA-expressing cancer is multiple myeloma, Waldenstroms macroglobulinemia, diffuse large B cell lymphoma (DLBCL), POEMS syndrome, or amyloidosis.

In another example, the present disclosure encompasses a method of treating an autoimmune disorder in a subject, the method comprising administering to the subject and effective amount of a binding protein defined herein. In another example, the present disclosure encompasses use of a binding protein defined herein in the manufacture of a medicament for treating an autoimmune disorder. In another example, the present disclosure encompasses a binding protein defined herein for use in treating an autoimmune disorder. In an example, the autoimmune disorder is selected from the group consisting of rheumatoid arthritis, systemic lupus erythematosus, diabetes mellitus, and multiple sclerosis.

Any example herein shall be taken to apply mutatis mutandis to any other example unless specifically stated otherwise.

The present disclosure is not to be limited in scope by the specific examples described herein, which are intended for the purpose of exemplification only. Functionally-equivalent products, compositions and methods are clearly within the scope of the disclosure, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The disclosure is hereinafter described by way of the following non-limiting Examples and with reference to the accompanying drawings.

BRIEF DESCRIPTION OF THE ACCOMPANYING DRAWINGS

FIG. 1. The 4G7 monoclonal antibody epitope on lambda free light chain. The panel on the left shows the alignment of the amino acid sequence of lambda free light chains 1, 2 and 3 isotypes whereby lambda isotypes 2 and 3 constitutes 95% of the expressed lambda light chain repertoire. Asterisks denote sequence identity. The divergent amino acids are highlighted. The right panel shows identified peptides in 3D structure of a lambda light chain dimer (MCG dimer) and the MCG Ig demonstrating that within the folded light chain protein the two peptides form a contagion to create a non-idiotypic conformational epitope.

Figure 2A:
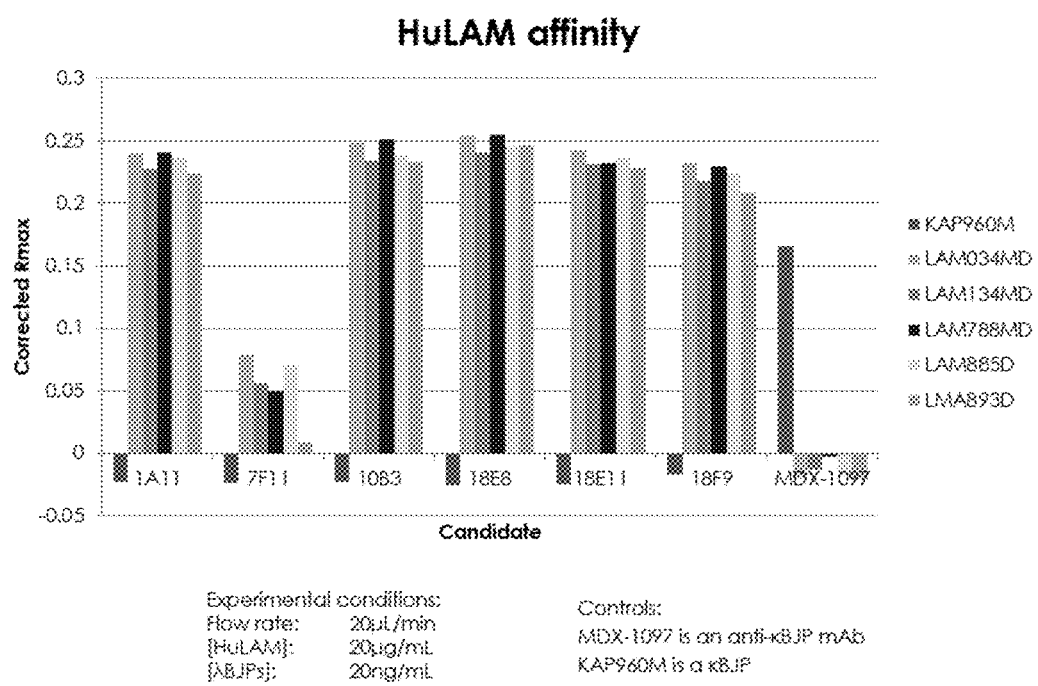
Figure 2B:
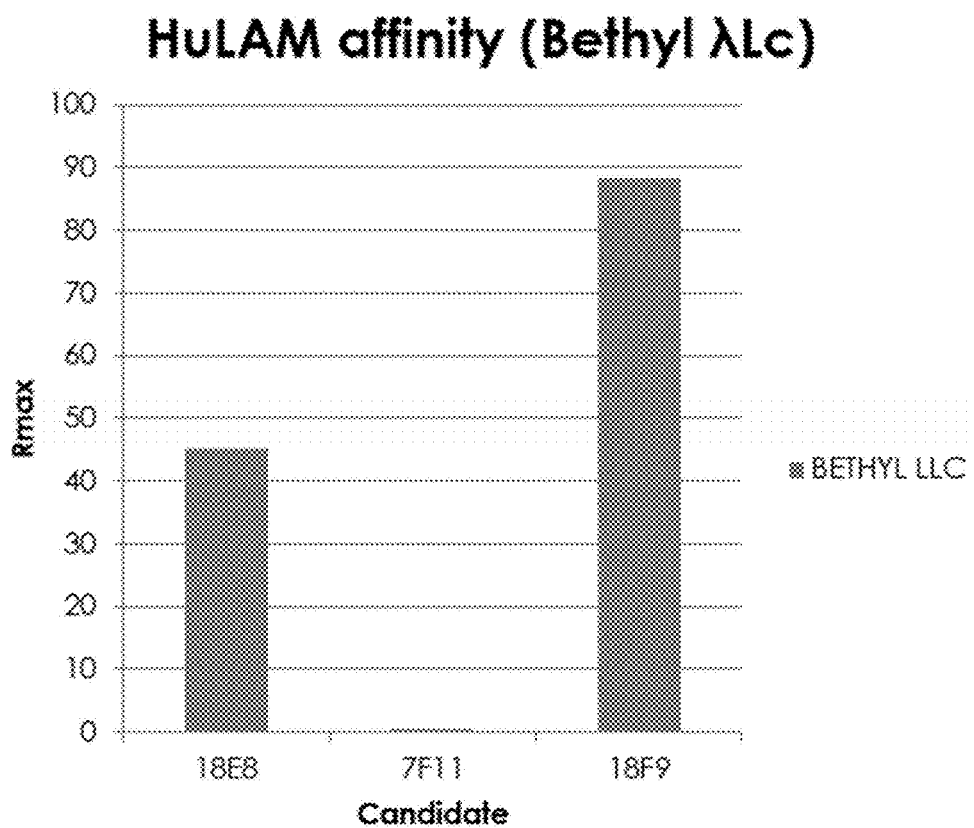

FIGS. 2A-2B. Affinity of human anti-LMA antibodies to purified lambda-light chains. (FIG. 2A) The graph depicts the SPR values 4G7.

Of human anti-LMA antibody clones (1A11, 7F11, 10B3, 18E8, 18E11 and 18F9) (20 µg/mL) against purified lambda-light chains BJP (LAM034MD, LAM134MD, MAL788MD, LAM885D, LAM893D) (20 ng/mL). Anti-κBJP monoclonal antibody MDX-1097 and κBJP (20 ng/mL) (KAP960M) were used as negative controls. Human anti-LMA antibody clones, apart from 7F11, demonstrated high and comparable selective affinity to purified lambda-light chains BJP; 7F11 demonstrated lower affinity. Abbreviations at the end of the lambda-light chains BJP: M: monomer; MD: mixture of monomer and dimeric forms; D: dimer. (FIG. 2B) The graph depicts the SPR values of human anti-LMA antibody clones (18E8, 7F11 and 18F9) (700 ng/mL) to commercial lambda-light chain (Bethyl). Human anti-LMA antibody 7F11 weakly binds to commercial lambda-light chain (Bethyl) compared to clones 18E8 and 18F9.

Figure 3:
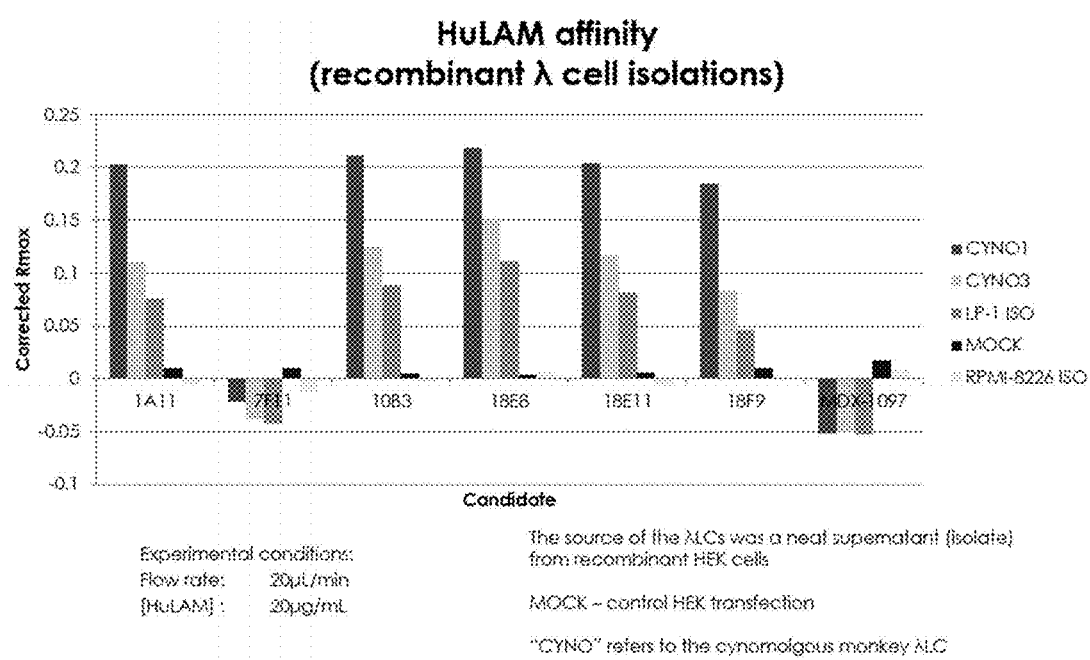

FIG. 3. Affinity of human anti-LMA antibodies to recombinant lambda-light chain isolates from HEK cells. The graph depicts the SPR values of human anti-LMA antibody candidates (1A11, 7F11, 10B3, 18E8, 18E11, 18F9) (20 µg/mL) against cynomologus monkey lambda-light chains (CYNO1, CYNO3), supernatant from lambda-light chain transfected HEK cells, LP-1 lambda-light chain isolate (LP-1 ISO) and RPMI-8226 lambda-light chain isolate (RPMI-8226 ISO). Anti-κBJP monoclonal antibody MDX-1097 was used as a negative control. Human anti-LMA antibody clones, apart from 7F11, demonstrated high and comparable selective affinity to cynomologus monkey lambda-light chains and lambda-light chain isolates from HEK, LP-1 and RPMI-8226; 7F11 demonstrated low affinity.

Figure 4:
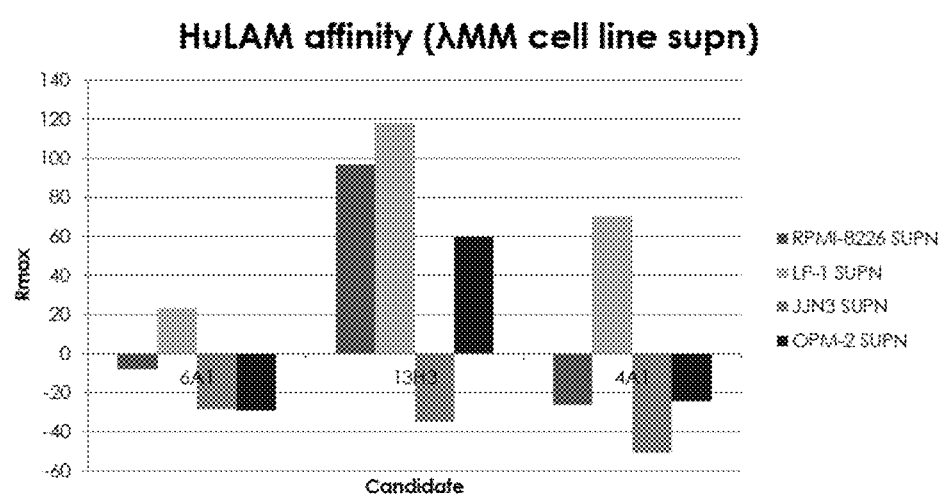

FIG. 4. Affinity of human anti-LMA antibodies to supernatant human multiple myeloma cell lines. The graph depicts the SPR values of human anti-LMA antibody candidates (6A1, 13H3 and 4A1) (20 µg/mL) against supernatant from human multiple myeloma cell lines (RPMI-8226 (lambda isotype 2), LP-1 (lambda isotype 1), JJN3 (kappa), OPM-2 (lambda isotype 3). Human anti-LMA antibody clones demonstrated high and selective affinity to soluble lambda light chain isotypes expressed by human multiple myeloma cell lines and not to kappa-light chain expressed by the JJN3 cell line.

Figure 5A:
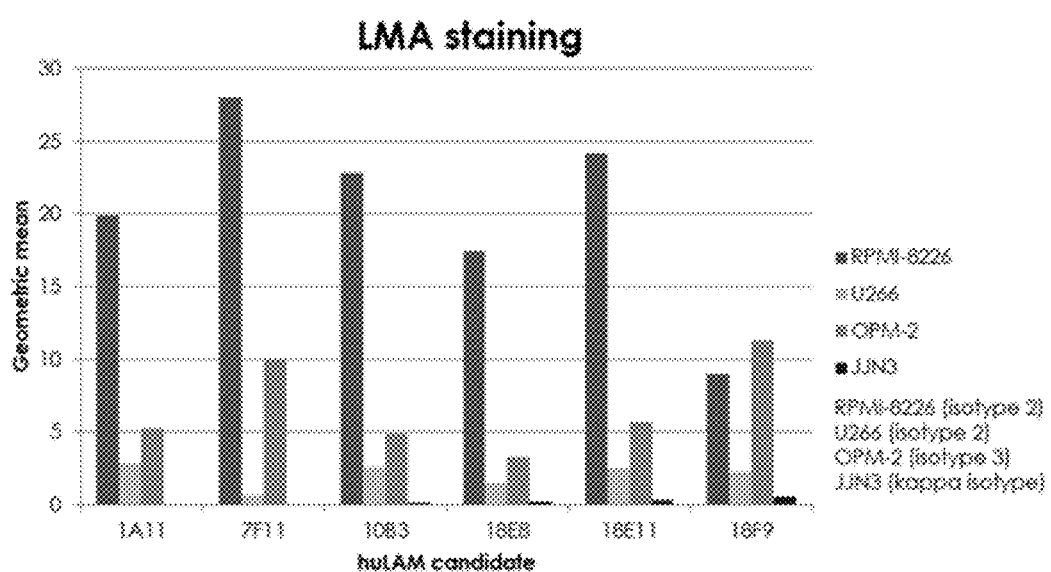
Figure 5B:
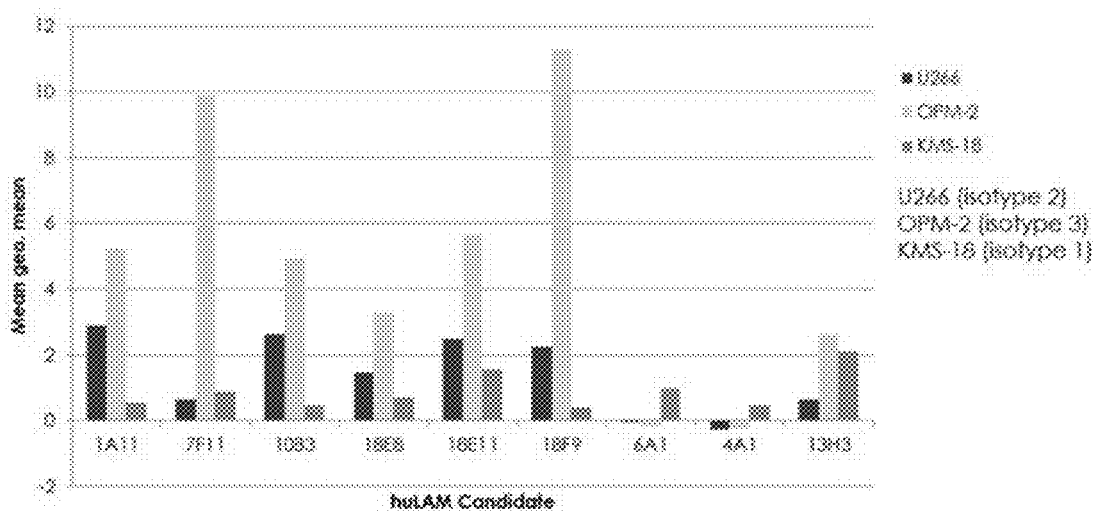

FIGS. 5A-5B. Binding of human anti-LMA antibodies to LMA positive human myeloma cell lines. (FIG. 5A) The graph depicts the relative staining (geometric mean) of LMA positive human myeloma cell lines (RPMI-8226 (lambda isotype 2), U266 (lambda isotype 2), JJN3 (kappa), OPM-2 (lambda isotype 3)) by the human anti-LMA antibody candidates (1A11, 7F11, 10B3, 18E8, 18E11 and 18F9) compared to no primary antibody control as determined by flow cytometric analysis. Human anti-LMA antibodies demonstrated selective staining of all tested human myeloma cell lines but did not (or weakly) stained JJN3 (kappa) cell line. (FIG. 5B) The graph depicts the relative staining (geometric mean) of LMA positive human myeloma cell lines (U266 (lambda isotype 2), OPM-2 (lambda isotype 3) and KMS-18 (lambda isotype 1) by the human anti-LMA antibody candidates (1A11, 7F11, 10B3, 18E8, 18E11, 18F9, 6A1, 4A1 and 13H3) compared to no primary antibody control as determined by flow cytometric analysis.

Figure 6:
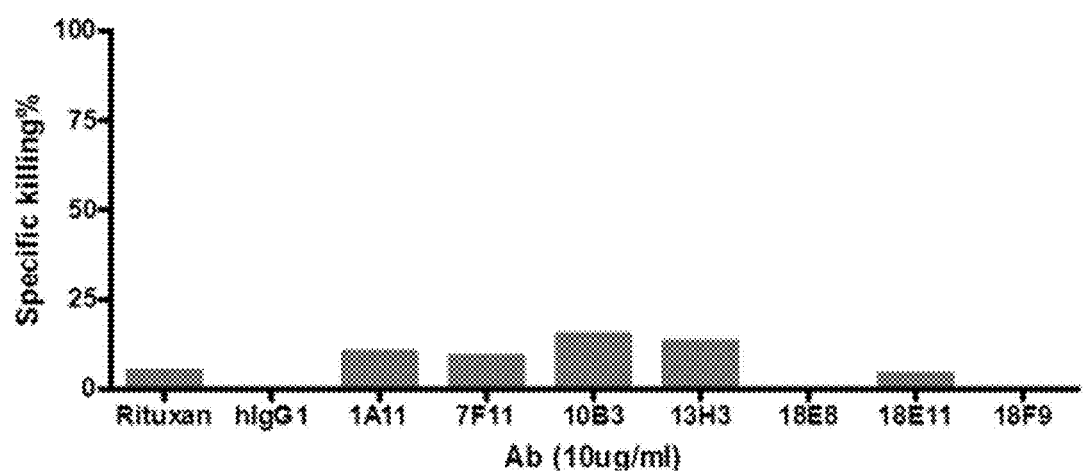

FIG. 6. Antibody dependent cellular cytotoxicity (ADCC) on myeloma cells.

Figure 7:
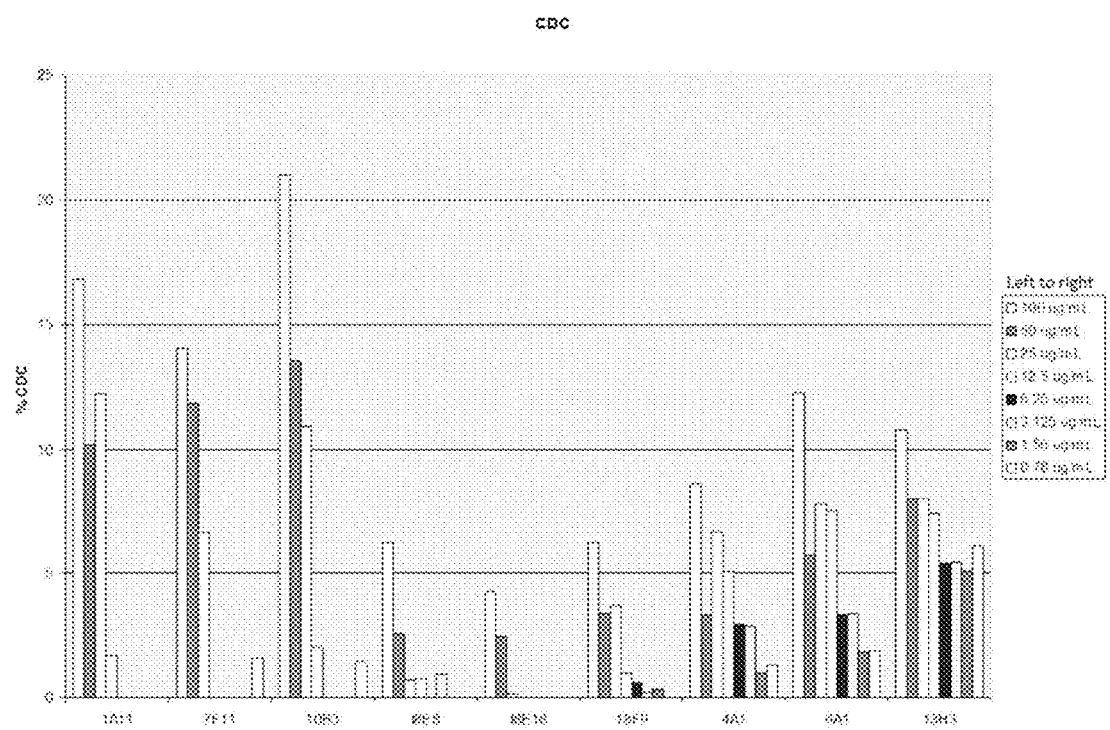

FIG. 7. Complement mediated cytotoxicity (CDC) on myeloma cells.

FIG. 8. Sequence alignment comparing 7F11 with 10B3, 18E11 and 18E8. Heavy chain CDRs underlined. Asterisks denote sequence identity.

Figure 9:
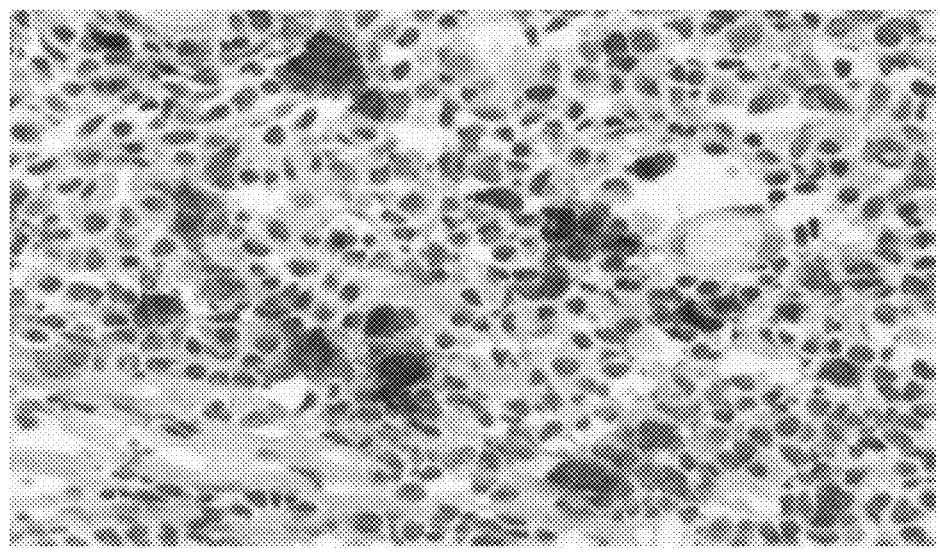
Figure 10:
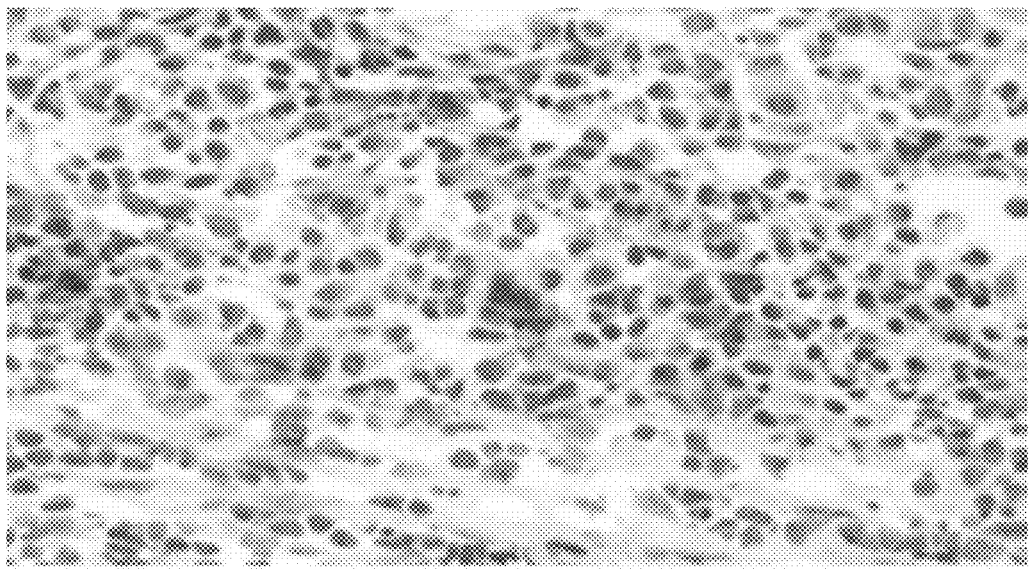

FIG. 9. Cryosection of human tonsil (HT2449-1) stained with 10B3 at 10 µg/mL. 40× objective FIG. 10. Cryosection of human tonsil (HT2449-1) stained with 7F11 at 10 µg/mL. 40× objective.

KEY TO SEQUENCE LISTING

NB: Kabat numbering system used to assign CDRs and Framework sequences

SEQ ID NO: 1—7F11 heavy chain CDR1 amino acid sequence
SEQ ID NO: 2—7F11 heavy chain CDR2 amino acid sequence
SEQ ID NO: 3—7F11 heavy chain CDR3 amino acid sequence
SEQ ID NO: 4—7F11 heavy chain frame work amino acid sequence
SEQ ID NO: 5—7F11 heavy chain full length amino acid sequence
SEQ ID NO: 6—7F11 light chain 1—CDR1 amino acid sequence
SEQ ID NO: 7—7F11 light chain 1—CDR2 amino acid sequence
SEQ ID NO: 8—7F11 light chain 1—CDR3 amino acid sequence
SEQ ID NO: 9—7F11 light chain 1—frame work amino acid sequence
SEQ ID NO: 10—7F11 light chain 1—full length amino acid sequence
SEQ ID NO: 11—7F11 light chain 2—CDR1 amino acid sequence
SEQ ID NO: 12—7F11 light chain 2—CDR2 amino acid sequence
SEQ ID NO: 13—7F11 light chain 2—CDR3 amino acid sequence
SEQ ID NO: 14—7F11 light chain 2—frame work amino acid sequence
SEQ ID NO: 15—7F11 light chain 2—full length amino acid sequence
SEQ ID NO: 16—7F11 heavy chain CDR1 DNA sequence
SEQ ID NO: 17—7F11 heavy chain CDR2 DNA sequence
SEQ ID NO: 18—7F11 heavy chain CDR3 DNA sequence
SEQ ID NO: 19—7F11 heavy chain frame work DNA sequence
SEQ ID NO: 20—7F11 heavy chain full length DNA sequence
SEQ ID NO: 21—7F11 light chain 1—CDR1 DNA sequence
SEQ ID NO: 22—7F11 light chain 1—CDR2 DNA sequence
SEQ ID NO: 23—7F11 light chain 1—CDR3 DNA sequence
SEQ ID NO: 24—7F11 light chain 1—frame work DNA sequence
SEQ ID NO: 25—7F11 light chain 1—full length DNA sequence
SEQ ID NO: 26—7F11 light chain 2—CDR1 DNA sequence
SEQ ID NO: 27—7F11 light chain 2—CDR2 DNA sequence
SEQ ID NO: 28—7F11 light chain 2—CDR3 DNA sequence SEQ ID NO: 29—7F11 light chain 2—frame work DNA sequence
SEQ ID NO: 30—7F11 light chain 2—full length DNA sequence
SEQ ID NO: 31—18E8 heavy chain CDR1 amino acid sequence
SEQ ID NO: 32—18E8 heavy chain CDR2 amino acid sequence
SEQ ID NO: 33—18E8 heavy chain CDR3 amino acid sequence
SEQ ID NO: 34—18E8 heavy chain frame work amino acid sequence
SEQ ID NO: 35—18E8 heavy chain full length amino acid sequence
SEQ ID NO: 36—18E8 light chain 1—CDR1 amino acid sequence
SEQ ID NO: 37—18E8 light chain 1—CDR2 amino acid sequence
SEQ ID NO: 38—18E8 light chain 1—CDR3 amino acid sequence
SEQ ID NO: 39—18E8 light chain 1—frame work amino acid sequence
SEQ ID NO: 40—18E8 light chain 1—full length amino acid sequence
SEQ ID NO: 41—18E8 light chain 2—CDR1 amino acid sequence
SEQ ID NO: 42—18E8 light chain 2—CDR2 amino acid sequence
SEQ ID NO: 43—18E8 light chain 2—CDR3 amino acid sequence
SEQ ID NO: 44—18E8 light chain 2—frame work amino acid sequence
SEQ ID NO: 45—18E8 light chain 2—full length amino acid sequence
SEQ ID NO: 46—18E8 heavy chain CDR1 DNA sequence
SEQ ID NO: 47—18E8 heavy chain CDR2 DNA sequence
SEQ ID NO: 48—18E8 heavy chain CDR3 DNA sequence
SEQ ID NO: 49—18E8 heavy chain frame work DNA sequence
SEQ ID NO: 50—18E8 heavy chain full length DNA sequence
SEQ ID NO: 51—18E8 light chain 1—CDR1 DNA sequence
SEQ ID NO: 52—18E8 light chain 1—CDR2 DNA sequence
SEQ ID NO: 53—18E8 light chain 1—CDR3 DNA sequence
SEQ ID NO: 54—18E8 light chain 1—frame work DNA sequence
SEQ ID NO: 55—18E8 light chain 1—full length DNA sequence
SEQ ID NO: 56—18E8 light chain 2—CDR1 DNA sequence
SEQ ID NO: 57—18E8 light chain 2—CDR2 DNA sequence
SEQ ID NO: 58—18E8 light chain 2—CDR3 DNA sequence
SEQ ID NO: 59—18E8 light chain 2—frame work DNA sequence
SEQ ID NO: 60—18E8 light chain 2—full length DNA sequence
SEQ ID NO: 61—10B3 heavy chain CDR1 amino acid sequence
SEQ ID NO: 62—10B3 heavy chain CDR2 amino acid sequence
SEQ ID NO: 63—10B3 heavy chain CDR3 amino acid sequence
SEQ ID NO: 64—10B3 heavy chain frame work amino acid sequence
SEQ ID NO: 65—10B3 heavy chain full length amino acid sequence
SEQ ID NO: 66—10B3 light chain 1—CDR1 amino acid sequence
SEQ ID NO: 67—10B3 light chain 1—CDR2 amino acid sequence
SEQ ID NO: 68—10B3 light chain 1—CDR3 amino acid sequence
SEQ ID NO: 69—10B3 light chain 1—frame work amino acid sequence
SEQ ID NO: 70—10B3 light chain 1—full length amino acid sequence
SEQ ID NO: 71—10B3 light chain 2—CDR1 amino acid sequence
SEQ ID NO: 72—10B3 light chain 2—CDR2 amino acid sequence
SEQ ID NO: 73—10B3 light chain 2—CDR3 amino acid sequence
SEQ ID NO: 74—10B3 light chain 2—frame work amino acid sequence
SEQ ID NO: 75—10B3 light chain 2—full length amino acid sequence
SEQ ID NO: 76—10B3 heavy chain CDR1 DNA sequence
SEQ ID NO: 77—10B3 heavy chain CDR2 DNA sequence
SEQ ID NO: 78—10B3 heavy chain CDR3 DNA sequence
SEQ ID NO: 79—10B3 heavy chain frame work DNA sequence
SEQ ID NO: 80—10B3 heavy chain full length DNA sequence
SEQ ID NO: 81—10B3 light chain 1—CDR1 DNA sequence
SEQ ID NO: 82—10B3 light chain 1—CDR2 DNA sequence
SEQ ID NO: 83—10B3 light chain 1—CDR3 DNA sequence
SEQ ID NO: 84—10B3 light chain 1—frame work DNA sequence
SEQ ID NO: 85—10B3 light chain 1—full length DNA sequence
SEQ ID NO: 86—10B3 light chain 2—CDR1 DNA sequence
SEQ ID NO: 87—10B3 light chain 2—CDR2 DNA sequence
SEQ ID NO: 88—10B3 light chain 2—CDR3 DNA sequence
SEQ ID NO: 89—10B3 light chain 2—frame work DNA sequence
SEQ ID NO: 90—10B3 light chain 2—full length DNA sequence
SEQ ID NO: 91—4G7 epitope (lambda isotype 2 and 3) epitope 1
SEQ ID NO: 92—4G7 epitope (lambda isotype 2 and 3) epitope 2
SEQ ID NO: 93—4G7 epitope (lambda isotype 1) epitope 1
SEQ ID NO: 94—4G7 epitope (lambda isotype 1) epitope 2

DETAILED DESCRIPTION OF THE INVENTION

General Techniques and Selected Definitions

Unless specifically defined otherwise, all technical and scientific terms used herein shall be taken to have the same meaning as commonly understood by one of ordinary skill in the art (e.g., molecular biology, biochemistry, antibodies, antibody fragments and clinical studies).

"Lambda myeloma antigen" (LMA) is a cell membrane antigen that is found on the surface of plasma cells such as malignant myeloma cells and, in some cases, non-malignant plasma cell precursors such as plasmablasts. Specifically, LMA consists of free lambda light chains expressed on the cell membrane. Anti-LMA binding proteins encompassed by the present disclosure specifically recognize a conformational epitope on the lambda light chain that is only available for binding when the lambda light chain is not associated with a heavy chain. Accordingly, anti-LMA binding proteins encompassed by the present disclosure do not bind to intact lambda-chain containing IgG, IgM, IgE or IgA.

As used herein, the term "binds" in reference to the interaction of a binding protein described herein and LMA means that the interaction is dependent upon the presence of a particular structure (e.g., an antigenic determinant or epitope) on LMA. For example, a binding protein recognizes and binds to a specific antigen structure rather than to antigens generally. For example, if a binding protein binds to epitope "A", the presence of a molecule containing epitope "A" (or free, unlabelled "A"), in a reaction containing labelled "A" and the binding protein, will reduce the amount of labelled "A" bound to the binding protein. In an example, an LMA binding protein disclosed herein preferentially binds LMA (i.e. cell surface antigen) over free lambda light chain (e.g. serum antigen). A binding protein disclosed herein that preferentially binds LMA over free lambda light chain reacts or associates more frequently, more rapidly, with greater duration and/or with greater affinity with LMA than it does with free light chain.

As used herein, the term "specifically binds" shall be taken to mean that the binding interaction between a binding protein and LMA is dependent on detection of the LMA by the binding protein. Accordingly, the binding protein specifically binds or recognizes LMA even when present in a mixture of other molecules, cells or organisms. In one example, the binding protein reacts or associates more frequently, more rapidly, with greater duration and/or with greater affinity with LMA than it does with alternative antigens or cells. In an example, a binding protein disclosed herein that specifically binds LMA can also preferentially bind or recognize LMA over free light chain. It is also understood by reading this definition that, for example, a binding protein that specifically binds to LMA may or may not specifically bind to a second antigen. As such, "specific binding" does not necessarily require exclusive binding or non-detectable binding of another antigen. The term "specifically binds" can be used interchangeably with "selectively binds" herein. Generally, reference herein to binding means specific binding, and each term shall be understood to provide explicit support for the other term. Methods for determining specific binding will be apparent to the skilled person. For example, a binding protein of the disclosure is contacted with LMA or an alternative antigen. Binding of the binding protein to LMA or alternative antigen is then determined and a binding protein that binds as set out above to the LMA rather than the alternative antigen is considered to specifically bind to LMA. A similar method may be used to identify preferential binding. In this instance, the alternative antigen would be free light chain.

The term "immunoglobulin" will be understood to include an anti-LMA binding protein comprising an immunoglobulin domain. Exemplary immunoglobulins are antibodies. Additional proteins encompassed by the term "immunoglobulin" include domain antibodies, camelid antibodies and antibodies from cartilaginous fish (i.e., immunoglobulin new antigen receptors (IgNARs)). Generally, camelid antibodies and IgNARs comprise a $V_H$, however lack a $V_L$ and are often referred to as heavy chain immunoglobulins. Other "immunoglobulins" include T cell receptors.

The term "binding protein" is used in the context of the present disclosure to refer to human immunoglobulin molecules immunologically reactive with a particular antigen and includes both polyclonal and monoclonal antibodies. The term "binding protein" also includes antigen binding forms of antibodies, including fragments with antigen-binding capability (e.g., Fab', F(ab')$_2$, Fab, Fv and rIgG as discussed in Pierce Catalogue and Handbook, 1994-1995 (Pierce Chemical Co., Rockford, Ill.); Kuby, J., Immunology, $3^{rd}$ Ed., W.H. Freeman & Co., New York (1998). The term is also used to refer to recombinant single chain Fv fragments (scFv) as well as divalent (di-scFv) and trivalent (tri-scFV) forms thereof. The term antibody also includes diabodies, triabodies, and tetrabodies.

An "antigen binding fragment" of an antibody comprises one or more variable regions of an intact antibody. Examples of antibody fragments include Fab, Fab', F(ab')2 and Fv fragments; diabodies; linear antibodies and single-chain antibody molecules formed from antibody fragments. For example, the term antigen binding fragment may be used to refer to recombinant single chain Fv fragments (scFv) as well as divalent (di-scFv) and trivalent (tri-scFV) forms thereof.

Such fragments can be produced via various methods known in the art.

The terms "full-length antibody", "intact antibody" or "whole antibody" are used interchangeably to refer to an antibody in its substantially intact form, as opposed to an antigen binding fragment of an antibody. Specifically, whole antibodies include those with heavy and light chains including an Fc region. The constant domains may be wild-type sequence constant domains (e.g., human wild-type sequence constant domains) or amino acid sequence variants thereof.

The term "complementarity determining region" or "CDR" is used in the context of the present disclosure to refer to the part of the two variable chains of antibodies (heavy and light chains) that recognize and bind to the particular antigen. The CDRs are the most variable portion of the variable chains and provide binding proteins with their specificity. There are generally three CDRs on each of the variable heavy ($V_H$) and variable light ($V_L$) chains.

As used herein, "variable region" refers to the portions of the light and/or heavy chains of an antibody as defined herein that specifically binds to an antigen and, for example, includes amino acid sequences of CDRs; i.e., CDR1, CDR2, and CDR3, and framework regions (FRs). For example, the variable region comprises three or four FRs (e.g., FR1, FR2, FR3 and optionally FR4) together with three CDRs. $V_H$ refers to the variable region of the heavy chain. $V_L$ refers to the variable region of the light chain.

In one example, the amino acid positions assigned to CDRs and FRs are defined according to Kabat Sequences of Proteins of Immunological Interest, National Institutes of Health, Bethesda, Md., 1987 and 1991 (also referred to herein as "the Kabat numbering system" or "Kabat".

Other conventions that include corrections or alternate numbering systems for variable domains include IMGT (Lefranc, et al. (2003), Dev Comp Immunol 27: 55-77), Chothia (Chothia C, Lesk AM (1987), J Mal Biol 196: 901-917; Chothia, et al. (1989), Nature 342: 877-883) and AHo (Honegger A, Plhckthun A (2001) J Mol Biol 309:

657-670). For convenience, examples of binding proteins of the present disclosure may also be labelled according to IMGT.

The term "constant region" as used herein, refers to a portion of heavy chain or light chain of an antibody other than the variable region. In a heavy chain, the constant region generally comprises a plurality of constant domains and a hinge region, e.g., a IgG constant region comprises the following linked components, a constant heavy CHI, a linker, a $C_H2$ and a $C_H3$. In a heavy chain, a constant region comprises a Fc. In a light chain, a constant region generally comprises one constant domain (a CL 1).

The term "fragment crystallizable" or "Fc" or "Fc region" or "Fc portion" (which can be used interchangeably herein) refers to a region of an antibody comprising at least one constant domain and which is generally (though not necessarily) glycosylated and which is capable of binding to one or more Fc receptors and/or components of the complement cascade. The heavy chain constant region can be selected from any of the five isotypes: $\alpha$, $\delta$, $\epsilon$, $\gamma$, or $\mu$. Exemplary heavy chain constant regions are gamma 1 (IgG1), gamma 2 (IgG2) and gamma 3 (IgG3), or hybrids thereof.

A "constant domain" is a domain in an antibody the sequence of which is highly similar in antibodies/antibodies of the same type, e.g., IgG or IgM or IgE. A constant region of an antibody generally comprises a plurality of constant domains, e.g., the constant region of $\gamma$, $\alpha$ or $\delta$ heavy chain comprises two constant domains.

The term "antibody heavy chain" is used herein to refer to the larger of the two types of polypeptide chains present in all antibody molecules in their naturally occurring conformations. An "antibody light chain," as used herein, refers to the smaller of the two types of polypeptide chains present in all antibody molecules in their naturally occurring conformations. $\kappa$ and $\lambda$ light chains refer to the two major antibody light chain isotypes.

The term "naked" is used to refer to binding proteins of the present disclosure that are not conjugated to another compound, e.g., a toxic compound or radiolabel. For example, the term "naked" can be used to refer to binding proteins that are not conjugated to another compound. Accordingly, in one example, the binding proteins of the present disclosure are "naked". Put another way, the binding proteins of the present disclosure can be un-conjugated.

In contrast, the term "conjugated" is used in the context of the present disclosure to refer to binding proteins described herein that are conjugated to another compound, e.g., a toxic compound such as a cytotoxic agent or radiolabel. Accordingly, in one example, a binding protein of the present disclosure is "conjugated".

The term "cytotoxic agent" as used herein refers to a substance that inhibits or prevents a cellular function and/or causes cell death or destruction. Cytotoxic agents include, but are not limited to, radioactive isotopes (e.g., $At^{211}$, $I^{131}$, $I^{125}$, $Y^{90}$, $Re^{186}$, $Re^{188}$, $Sm^{153}$, Bi, P, Pb and radioactive isotopes of Lu), chemotherapeutic agents or drugs (e.g., methotrexate, adriamicin, vinca alkaloids (vincristine, vinblastine, etoposide), doxorubicin, melphalan, mitomycin C, chlorambucil, daunorubicin or other intercalating agents); growth inhibitory agents; enzymes and fragments thereof such as nucleolytic enzymes; antibiotics; toxins such as small molecule toxins or enzymatically active toxins of bacterial, fungal, plant or animal origin, including fragments and/or variants thereof; and the various antitumor or anticancer agents disclosed below.

Terms such as "host cell," "host cell line," and "host cell culture" are used interchangeably in the context of the present disclosure to refer to cells into which exogenous nucleic acid has been introduced, including the progeny of such cells. Host cells include "transformants" and "transformed cells," which include the primary transformed cell and progeny derived therefrom without regard to the number of passages. Progeny may not be completely identical in nucleic acid content to a parent cell, but may contain mutations. Mutant progeny that have the same function or biological activity as screened or selected for in the originally transformed cell are included herein.

An "isolated nucleic acid" according to the present disclosure is a nucleic acid molecule that has been separated from a component of its natural environment. An isolated nucleic acid includes a nucleic acid molecule contained in cells that ordinarily contain the nucleic acid molecule, but the nucleic acid molecule is present extrachromosomally or at a chromosomal location that is different from its natural chromosomal location.

The term "expression vector" as used herein refers to a vector comprising a recombinant nucleic acid sequence comprising at least one expression control sequence operatively linked to the nucleic acid sequence to be expressed. An expression vector comprises all necessary cis acting elements required for expression. Examples of expression vectors include, but are not limited to, plasmids, cosmids, and viruses that encode the recombinant polynucleotide to be expressed. In other examples, the expression vector comprises transposable elements that are capable of integrating into the genome, for example, the PiggyBac expression system. In another example, the expression vector is a viral vector that allows for integration of the expression vector contents into the host genome, for example retroviral and lentiviral vectors.

"Percent (%) amino acid sequence identity" with respect to a reference polypeptide sequence is defined as the percentage of amino acid residues in a candidate sequence that are identical with the amino acid residues in the reference polypeptide sequence, after aligning the sequences and introducing gaps, if necessary, to achieve the maximum percent sequence identity, and not considering any conservative substitutions as part of the sequence identity. Alignment for purposes of determining percent amino acid sequence identity can be achieved in various ways that are within the skill of those practicing in the art, for instance, using publicly available computer software such as BLAST, BLAST-2, ALIGN or Megalign (DNASTAR) software. Those skilled in the art can determine appropriate parameters for aligning sequences, including any algorithms needed to achieve maximal alignment over the full length of the sequences being compared.

Binding proteins according to the present disclosure and compositions comprising the same can be administered to a subject to treat various indications. Terms such as "subject", "patient" or "individual" are terms that can, in context, be used interchangeably in the present disclosure. In an example, the subject is a mammal. The mammal may be a companion animal such as a dog or cat, or a livestock animal such as a horse or cow. In one example, the subject is a human. For example, the subject can be an adult. In another example, the subject can be a child. In another example, the subject can be an adolescent.

As used herein, the term "treatment" refers to clinical intervention designed to alter the natural course of the individual or cell being treated during the course of clinical pathology. Desirable effects of treatment include decreasing the rate of disease progression, ameliorating or palliating the disease state, and remission or improved prognosis. An individual is successfully "treated", for example, if one or more symptoms associated with a disease are mitigated or eliminated.

As used herein, the term "prevention" includes providing prophylaxis with respect to occurrence or recurrence of a disease in an individual. An individual may be predisposed to or at risk of developing the disease or disease relapse but has not yet been diagnosed with the disease or the relapse.

An "effective amount" refers to at least an amount effective, at dosages and for periods of time necessary, to achieve the desired therapeutic or prophylactic result. An effective amount can be provided in one or more administrations. In some examples of the present disclosure, the term "effective amount" is meant an amount necessary to effect treatment of a disease or condition described below. The effective amount may vary according to the disease or condition to be treated and also according to the weight, age, racial background, sex, health and/or physical condition and other factors relevant to the subject being treated. Typically, the effective amount will fall within a relatively broad range (e.g. a "dosage" range) that can be determined through routine trial and experimentation by a medical practitioner.

A "therapeutically effective amount" is at least the minimum concentration required to effect a measurable improvement of a particular disorder (e.g. cancer). A therapeutically effective amount herein may vary according to factors such as the disease state, age, sex, and weight of the patient, and the ability of the binding protein to elicit a desired response in the individual. A therapeutically effective amount is also one in which any toxic or detrimental effects of the binding protein are outweighed by the therapeutically beneficial effects. In the case of cancer, a therapeutically effective amount of a binding protein may reduce the number of cancer cells; reduce the primary tumour size; inhibit (i.e., slow to some extent and, in some examples, stop) cancer cell infiltration into peripheral organs; inhibit (i.e., slow to some extent and, in some examples, stop) tumour metastasis; inhibit or delay, to some extent, tumour growth or tumour progression; and/or relieve to some extent one or more of the symptoms associated with the cancer. To the extent the binding protein may prevent growth and/or kill existing cancer cells, it may be cytostatic and/or cytotoxic. For cancer therapy, efficacy in vivo can, for example, be measured by assessing the duration of survival, time to disease progression (TTP), the response rates (RR), duration of response, and/or quality of life.

Human Binding Proteins

The present disclosure relates to "human" binding proteins. In an example, "human" binding proteins of the present disclosure can include amino acid residues not encoded by human sequences, e.g. mutations introduced by random or site directed mutations in vitro (in particular mutations which involve conservative substitutions or mutations in a small number of residues of the protein, e.g. in 1, 2, 3, 4 or 5 of the residues of the protein). These "human binding proteins" do not necessarily need to be generated as a result of an immune response of a human, rather, they can be generated using recombinant means (e.g., screening a phage display library) and/or by a transgenic animal (e.g., a mouse) comprising nucleic acid encoding human antibody constant and/or variable regions and/or using guided selection (e.g., as described in or U.S. Pat. No. 5,565,332). This term also encompasses affinity matured forms of such antibodies. In an example, the term encompasses human antibodies.

Monoclonal antibodies are another exemplary form of binding protein contemplated by the present disclosure. The term "monoclonal antibody" or "MAb" refers to a homogeneous antibody population capable of binding to the same antigen(s), for example, to the same epitope within the antigen. This term is not intended to be limited as regards to the source of the antibody or the manner in which it is made.

The present disclosure also contemplates a deimmunized antibody or antigen binding fragment thereof, e.g., as described in WO2000/34317 and WO2004/108158. Deimmunized antibodies and fragments have one or more epitopes, e.g., B cell epitopes or T cell epitopes removed (i.e., mutated) to thereby reduce the likelihood that a subject will raise an immune response against the antibody or protein. For example, an antibody of the disclosure is analyzed to identify one or more B or T cell epitopes and one or more amino acid residues within the epitope is mutated to thereby reduce the immunogenicity of the antibody.

Antibody Fragments

Single-Domain Antibodies

In some examples, a binding protein of the disclosure is or comprises a single-domain antibody (which is used interchangeably with the term "domain antibody" or "dAb"). A single-domain antibody is a single polypeptide chain comprising all or a portion of the heavy chain variable domain of an antibody.

Single Chain Fv (scFv) Fragments

One of skill in the art will be aware that scFv's comprise $V_H$ and $V_L$ regions in a single polypeptide chain and a polypeptide linker between the $V_H$ and $V_L$ which enables the scFv to form the desired structure for antigen binding (i.e., for the $V_H$ and $V_L$ of the single polypeptide chain to associate with one another to form a Fv). Single-chain variable fragments lack the constant Fc region found in complete antibody molecules and therefore can have reduced immunogenicity. Exemplary linkers comprise in excess of 12 amino acid residues with $(Gly_4Ser)_3$ being one of the more favoured linkers for a scFv.

The present disclosure also contemplates a disulfide stabilized Fv (or diFv or dsFv), in which a single cysteine residue is introduced into a FR of $V_H$ and a FR of $V_L$ and the cysteine residues linked by a disulfide bond to yield a stable Fv.

In another example, the present disclosure encompasses a dimeric scFv (di-scFV), i.e., a protein comprising two scFv molecules linked by a non-covalent or covalent linkage, e.g., by a leucine zipper domain (e.g., derived from Fos or Jun) or trimeric scFV (tri-scFv). In another example, two scFv's are linked by a peptide linker of sufficient length to permit both scFv's to form and to bind to an antigen, e.g., as described in U.S. Published Application No. 20060263367.

Diabodies. Triabodies. Tetrabodies

In some examples, an antigen binding fragment of the disclosure is or comprises a diabody, triabody, tetrabody or higher order protein complex such as those described in WO98/044001 and/or WO94/007921.

For example, a diabody is a protein comprising two associated polypeptide chains, each polypeptide chain comprising the structure $V_L$-X-$V_H$ or $V_H$-X-$V_L$, wherein X is a linker comprising insufficient residues to permit the $V_H$ and $V_L$ in a single polypeptide chain to associate (or form an Fv) or is absent, and wherein the $V_H$ of one polypeptide chain binds to a $V_L$ of the other polypeptide chain to form an antigen binding site, i.e., to form a Fv molecule capable of specifically binding to one or more antigens.

Immunoglobulins and Immunoglobulin Fragments

An example of a binding protein of the present disclosure is a protein (e.g., an antibody mimetic) comprising a variable region of an immunoglobulin, such as a T cell receptor or a heavy chain immunoglobulin (e.g., an IgNAR, a camelid antibody).

V-Like Proteins

An example of a binding protein of the disclosure is a T-cell receptor. T cell receptors have two V-domains that combine into a structure similar to the Fv module of an antibody. Novotny et al., Proc Natl Acad Sci USA 88: 8646-8650, 1991 describes how the two V-domains of the T-cell receptor (termed alpha and beta) can be fused and expressed as a single chain polypeptide and, further, how to alter surface residues to reduce the hydrophobicity directly analogous to an antibody scFv. Other publications describing production of single-chain T-cell receptors or multimeric T cell receptors comprising two V-alpha and V-beta domains include WO1999/045110 or WO2011/107595.

Other non-antibody proteins comprising antigen binding domains include proteins with V-like domains, which are generally monomeric. Examples of proteins comprising such V-like domains include CTLA-4, CD28 and ICOS. Further disclosure of proteins comprising such V-like domains is included in WO1999/045110.

Affibodies

In a further example, a binding protein of the disclosure is an affibody. An affibody is a scaffold derived from the Z domain (antigen binding domain) of Protein A of *Staphylococcus aureus* which can be engineered to bind to antigen. The Z domain consists of a three-helical bundle of approximately 58 amino acids. Libraries have been generated by randomization of surface residues. For further details see EP1641818.

Avimers

In a further example, a binding protein of the disclosure is an Avimer. Avimers are multidomain proteins derived from the A-domain scaffold family. The native domains of approximately 35 amino acids adopt a defined disulfide bonded structure. Diversity is generated by shuffling of the natural variation exhibited by the family of A-domains. For further details see WO2002/088171.

Other Binding Proteins

Other examples of binding proteins encompassed by the present disclosure include:
(i) peptide display scaffolds such as affimers and adhirons (WO2009136182; Tiede et al. (2014) Protein Eng Des Sel 27, 145-155); and,
(ii) centyrins (Jacobs et al. (2012) Protein Eng Des Sel. 25, 107-117; Diem et al. (2014) Protein Eng Des sel. 27, 49-429).

Lambda Myeloma Antigen (LMA) Binding Proteins

Binding proteins defined herein have an antigen binding domain that binds to or specifically binds to Lambda Myeloma Antigen (LMA). In an example, binding proteins defined herein have an antigen binding domain that preferentially binds LMA over free light chain. In one example, anti-LMA binding proteins according to the present disclosure comprise a heavy chain variable region ($V_H$) having a CDR 1 as shown in SEQ ID NO: 1, a CDR2 as shown in SEQ ID NO: 2 and a CDR3 as shown in SEQ ID NO: 3. In another example, the anti-LMA binding proteins comprise a light chain variable region ($V_L$) having a CDR1 as shown in SEQ ID NO: 6, a CDR2 as shown in SEQ ID NO: 7 and a CDR3 as shown in SEQ ID NO: 8 or SEQ ID NO: 13.

In another example, the anti-LMA binding proteins comprise a light chain variable region ($V_L$) having a CDR1 as shown in SEQ ID NO: 6, a CDR2 as shown in SEQ ID NO: 7 and a CDR3 as shown in SEQ ID NO: 8. In another example, the anti-LMA binding proteins comprise a light chain variable region ($V_L$) having a CDR1 as shown in SEQ ID NO: 6, a CDR2 as shown in SEQ ID NO: 7 and a CDR3 as shown in SEQ ID NO: 13. Accordingly, in another example, the anti-LMA binding proteins comprise a $V_H$ having a CDR 1 as shown in SEQ ID NO: 1, a CDR2 as shown in SEQ ID NO: 2 and a CDR3 as shown in SEQ ID NO: 3 and a $V_L$ having a CDR1 as shown in SEQ ID NO: 6, a CDR2 as shown in SEQ ID NO: 7 and a CDR3 as shown in SEQ ID NO: 8. In another example, the anti-LMA binding proteins comprise a $V_H$ having a CDR 1 as shown in SEQ ID NO: 1, a CDR2 as shown in SEQ ID NO: 2 and a CDR3 as shown in SEQ ID NO: 3 and a $V_L$ having a CDR1 as shown in SEQ ID NO: 6, a CDR2 as shown in SEQ ID NO: 7 and a CDR3 as shown in SEQ ID NO: 13. In an embodiment of these examples, the LMA binding protein binds LMA isotype 2 and isotype 3.

In another example, the anti-LMA binding proteins comprise a $V_H$ comprising an amino acid sequence at least 95% identical to the sequence shown in SEQ ID NO: 4. In another example, the anti-LMA binding protein comprises a $V_L$ comprising an amino acid sequence at least 95% identical to the sequence shown in SEQ ID NO: 9 or SEQ ID NO: 14. For example, the $V_L$ can comprise an amino acid sequence at least 95% identical to the sequence shown in SEQ ID NO: 9. In another example, the $V_L$ can comprise an amino acid sequence at least 95% identical to the sequence shown in SEQ ID NO: 14. In another example, the $V_H$ comprises an amino acid sequence at least 95% identical to the sequence shown in SEQ ID NO: 5. In another example, the $V_L$ comprises an amino acid sequence at least 95% identical to the sequence shown in SEQ ID NO: 10 or SEQ ID NO: 15. For example, the $V_L$ can comprise an amino acid sequence at least 95% identical to the sequence shown in SEQ ID NO: 10. In another example, the $V_L$ comprises an amino acid sequence at least 95% identical to the sequence shown in SEQ ID NO: 15. Accordingly, in another example, the anti-LMA binding protein comprises a $V_H$ comprising an amino acid sequence at least 95% identical to the sequence shown in SEQ ID NO: 4 and a $V_L$ comprising an amino acid sequence at least 95% identical to the sequence shown in SEQ ID NO: 10 or SEQ ID NO: 15. For example, the $V_H$ can comprise an amino acid sequence at least 95% identical to the sequence shown in SEQ ID NO: 4 and a $V_L$ comprising an amino acid sequence at least 95% identical to the sequence shown in SEQ ID NO: 10. For example, the $V_H$ can comprise an amino acid sequence at least 95% identical to the sequence shown in SEQ ID NO: 4 and a $V_L$ comprising an amino acid sequence shown in SEQ ID NO: 15. In these examples, the $V_H$ and/or $V_L$ can be at least 96%, at least 97%, at least 98% or at least 99% identical to the recited SEQ ID NO.

In another example, the anti-LMA binding proteins comprise a $V_H$ comprising an amino acid sequence shown in SEQ ID NO: 4. In another example, the anti-LMA binding protein comprises a $V_L$ comprising an amino acid sequence shown in SEQ ID NO: 9 or SEQ ID NO: 14. For example, the $V_L$ can comprise an amino acid sequence shown in SEQ ID NO: 9. In another example, the $V_L$ can comprise an amino acid sequence shown in SEQ ID NO: 14. In another example, the $V_H$ comprises an amino acid sequence shown in SEQ ID NO: 5. In another example, the $V_L$ comprises an amino acid sequence shown in SEQ ID NO: 10 or SEQ ID NO: 15. For example, the $V_L$ can comprise an amino acid sequence shown in SEQ ID NO: 10. In another example, the $V_L$ comprises an amino acid sequence shown in SEQ ID NO: 15. Accordingly, in another example, the anti-LMA binding protein comprises a $V_H$ comprising an amino acid sequence shown in SEQ ID NO: 4 and a $V_L$ comprising an amino acid sequence shown in SEQ ID NO: 10 or SEQ ID NO: 15. For example, the $V_H$ can comprise an amino acid sequence shown in SEQ ID NO: 4 and a $V_L$ comprising an amino acid sequence shown in SEQ ID NO: 10. For example, the $V_H$ can comprise an amino acid sequence shown in SEQ ID NO: 4 and a $V_L$ comprising an amino acid sequence shown in SEQ ID NO: 15. In these examples, the binding protein specifically binds LMA. For example, the binding protein can preferentially binds LMA over free lambda light chain.

In another example, the anti-LMA binding proteins comprise a heavy chain variable region ($V_H$) having a CDR1 as shown in SEQ ID NO: 31, a CDR2 as shown in SEQ ID NO: 32 and a CDR3 as shown in SEQ ID NO: 33. In another example, the anti-LMA binding proteins comprise a heavy chain variable region ($V_H$) having a CDR1 as shown in SEQ ID NO: 61, a CDR2 as shown in SEQ ID NO: 62 and a CDR3 as shown in SEQ ID NO: 63. In another example, the anti-LMA binding proteins comprise a light chain variable region ($V_L$) having a CDR1 as shown in SEQ ID NO: 36 or SEQ ID NO: 41, a CDR2 as shown in SEQ ID NO: 37 or SEQ ID NO: 42 and a CDR3 as shown in SEQ ID NO: 38 or SEQ ID NO: 43. For example, the anti-LMA binding protein can comprise a $V_L$ having a CDR1 as shown in SEQ ID NO: 36, a CDR2 as shown in SEQ ID NO: 37 and a CDR3 as shown in SEQ ID NO: 38. In another example, the anti-LMA binding protein can comprise a $V_L$ having a CDR1 as shown in SEQ ID NO: 41, a CDR2 as shown in SEQ ID NO: 42 and a CDR3 as shown in SEQ ID NO: 43. Accordingly, in an example, the anti-LMA binding protein can comprise a heavy chain variable region ($V_H$) having a CDR1 as shown in SEQ ID NO: 31, a CDR2 as shown in SEQ ID NO: 32 and a CDR3 as shown in SEQ ID NO: 33 and a $V_L$ comprising a CDR1 as shown in SEQ ID NO: 36 or SEQ ID NO: 41, a CDR2 as shown in SEQ ID NO: 37 or SEQ ID NO: 42 and a CDR3 as shown in SEQ ID NO: 38 or SEQ ID NO: 43. For example, the anti-LMA binding protein can comprise a heavy chain variable region ($V_H$) having a CDR1 as shown in SEQ ID NO: 31, a CDR2 as shown in SEQ ID NO: 32 and a CDR3 as shown in SEQ ID NO: 33 and a $V_L$ comprising a CDR1 as shown in SEQ ID NO: 36, a CDR2 as shown in SEQ ID NO: 37 and a CDR3 as shown in SEQ ID NO: 38. In another example, the anti-LMA binding protein can comprise a heavy chain variable region ($V_H$) having a CDR1 as shown in SEQ ID NO: 31, a CDR2 as shown in SEQ ID NO: 32 and a CDR3 as shown in SEQ ID NO: 33 and a $V_L$ comprising a CDR1 as shown in SEQ ID NO: 41, a CDR2 as shown in SEQ ID NO: 42 and a CDR3 as shown in SEQ ID NO: 43.

In another example, the anti-LMA binding protein can comprise a heavy chain variable region ($V_H$) having a CDR1 as shown in SEQ ID NO: 61, a CDR2 as shown in SEQ ID NO: 62 and a CDR3 as shown in SEQ ID NO: 63 and a $V_L$ comprising a CDR1 as shown in SEQ ID NO: 66 or SEQ ID NO: 71, a CDR2 as shown in SEQ ID NO: 67 or SEQ ID NO: 72 and a CDR3 as shown in SEQ ID NO: 68 or SEQ ID NO: 73. For example, the anti-LMA binding protein can comprise a heavy chain variable region ($V_H$) having a CDR1 as shown in SEQ ID NO: 61, a CDR2 as shown in SEQ ID NO: 62 and a CDR3 as shown in SEQ ID NO: 63 and a $V_L$ comprising a CDR1 as shown in SEQ ID NO: 66, a CDR2 as shown in SEQ ID NO: 67 and a CDR3 as shown in SEQ ID NO: 68. In another example, the anti-LMA binding protein can comprise a heavy chain variable region ($V_H$) having a CDR1 as shown in SEQ ID NO: 61, a CDR2 as shown in SEQ ID NO: 62 and a CDR3 as shown in SEQ ID NO: 63 and a $V_L$ comprising a CDR1 as shown in SEQ ID NO: 71, a CDR2 as shown in SEQ ID NO: 72 and a CDR3 as shown in SEQ ID NO: 73. In an embodiment of these examples, the LMA binding protein binds LMA isotype 1, 2 and isotype 3.

In another example, the $V_H$ comprises an amino acid sequence at least 95% identical to the sequence shown in SEQ ID NO: 34 or SEQ ID NO: 64. For example, the $V_H$ can comprise an amino acid sequence at least 95% identical to the sequence shown in SEQ ID NO: 34. In another example, the $V_H$ can comprise an amino acid sequence at least 95% identical to the sequence shown in SEQ ID NO: 64. In another example, the $V_L$ comprises an amino acid sequence at least 95% identical to an amino acid sequence shown in any one of SEQ ID NOs: 39, 44, 69 or 74. In another example, $V_H$ comprises an amino acid sequence at least 95% identical to the sequence shown in SEQ ID NO: 34 or SEQ ID NO: 64 and the $V_L$ comprises an amino acid sequence at least 95% identical to an amino acid sequence shown in any one of SEQ ID NOs: 39, 44, 69 of 74. For example, the $V_H$ can comprise an amino acid sequence at least 95% identical to the sequence shown in SEQ ID NO: 34 and the $V_L$ can comprise an amino acid sequence at least 95% identical to the sequence shown in SEQ ID NO: 39. In another example, the $V_H$ can comprise an amino acid sequence at least 95% identical to the sequence shown in SEQ ID NO: 34 and the $V_L$ can comprise an amino acid sequence at least 95% identical to the sequence shown in SEQ ID NO: 44. In another example, the $V_H$ can comprise an amino acid sequence at least 95% identical to the sequence shown in SEQ ID NO: 64 and the $V_L$ can comprise an amino acid sequence at least 95% identical to the sequence shown in SEQ ID NO: 39. In another example, the $V_H$ can comprise an amino acid sequence at least 95% identical to the sequence shown in SEQ ID NO: 64 and the $V_L$ can comprise an amino acid sequence at least 95% identical to the sequence shown in SEQ ID NO: 44. In another example, the $V_H$ can comprise an amino acid sequence at least 95% identical to the sequence shown in SEQ ID NO: 64 and the $V_L$ can comprise an amino acid sequence at least 95% identical to the sequence shown in SEQ ID NO: 69. In another example, the $V_H$ can comprise an amino acid sequence at least 95% identical to the sequence shown in SEQ ID NO: 64 and the $V_L$ can comprise an amino acid sequence at least 95% identical to the sequence shown in SEQ ID NO: 74. In another example, the $V_H$ can comprise an amino acid sequence at least 95% identical to the sequence shown in SEQ ID NO: 5 and the $V_L$ can comprise an amino acid sequence at least 95% identical to the sequence shown in SEQ ID NO: 10 or SEQ ID NO: 15. In another example, the $V_H$ can comprise an amino acid sequence at least 95% identical to the sequence shown in SEQ ID NO: 5 and the $V_L$ can comprise an amino acid sequence at least 95% identical to the sequence shown in SEQ ID NO: 10. In another example, the $V_H$ can comprise an amino acid sequence at least 95% identical to the sequence shown in SEQ ID NO: 5 and the $V_L$ can comprise an amino acid sequence at least 95% identical to the sequence shown in or SEQ ID NO: 15. In another example, the $V_H$ can comprise an amino acid sequence at least 95% identical to the sequence shown in SEQ ID NO: 34 and the $V_L$ can comprise an amino acid sequence at least 95% identical to the sequence shown in SEQ ID NO: 40 or SEQ ID NO: 45. In another example, the $V_H$ can comprise an amino acid sequence at least 95% identical to the sequence shown in SEQ ID NO: 34 and the $V_L$ can comprise an amino acid sequence at least 95% identical to the sequence shown in or SEQ ID NO: 40. In another example, the $V_H$ can comprise an amino acid sequence at least 95% identical to the sequence shown in SEQ ID NO: 34 and the V$_L$ can comprise an amino acid sequence at least 95% identical to the sequence shown in SEQ ID NO: 10 or SEQ ID NO: 45. In another example, the V$_H$ can comprise an amino acid sequence at least 95% identical to the sequence shown in SEQ ID NO: 65 and the V$_L$ can comprise an amino acid sequence at least 95% identical to the sequence shown in SEQ ID NO: 70 or SEQ ID NO: 75. In another example, the V$_H$ can comprise an amino acid sequence at least 95% identical to the sequence shown in SEQ ID NO: 65 and the V$_L$ can comprise an amino acid sequence at least 95% identical to the sequence shown in SEQ ID NO: 70. In another example, the V$_H$ can comprise an amino acid sequence at least 95% identical to the sequence shown in SEQ ID NO: 65 and the V$_L$ can comprise an amino acid sequence at least 95% identical to the sequence shown in or SEQ ID NO: 75. In these examples, the V$_H$ and/or V$_L$ can be at least 96%, at least 97%, at least 98% or at least 99% identical to the recited SEQ ID NO. In another example, the V$_H$ comprises the amino acid sequence shown in SEQ ID NO: 34 or SEQ ID NO: 64. For example, the V$_H$ comprises the amino acid sequence shown in SEQ ID NO: 34. In another example, the V$_H$ comprises the amino acid sequence shown in SEQ ID NO: 64. In another example, the V$_L$ comprises the amino acid sequence shown in any one of SEQ ID NOs: 39, 44, 69 or 74. In another example, the V$_H$ comprises the amino acid sequence shown in SEQ ID NO: 34 or SEQ ID NO: 64 and the V$_L$ comprises the amino acid sequence shown in any one of SEQ ID NOs: 39, 44, 69 of 74. For example, the V$_H$ can comprise the amino acid sequence shown in SEQ ID NO: 34 and the V$_L$ can comprise the amino acid sequence shown in SEQ ID NO: 39. In another example, the V$_H$ comprises the amino acid sequence shown in SEQ ID NO: 34 and the V$_L$ comprises the amino acid sequence shown in SEQ ID NO: 44. In another example, the V$_H$ comprises the amino acid sequence shown in SEQ ID NO: 64 and the V$_L$ comprises the amino acid sequence shown in SEQ ID NO: 39. In another example, the V$_H$ comprises the amino acid sequence shown in SEQ ID NO: 64 and the V$_L$ comprises the amino acid sequence shown in SEQ ID NO: 44. In another example, the V$_H$ comprises the amino acid sequence shown in SEQ ID NO: 64 and the V$_L$ comprises the amino acid sequence shown in SEQ ID NO: 69. In another example, the V$_H$ comprises the amino acid sequence shown in SEQ ID NO: 64 and the V$_L$ comprises the amino acid sequence shown in SEQ ID NO: 74. In another example, the V$_H$ comprises the amino acid sequence shown in SEQ ID NO: 5 and the V$_L$ comprises the amino acid sequence shown in SEQ ID NO: 10 or SEQ ID NO: 15. In another example, the V$_H$ comprises the amino acid sequence shown in SEQ ID NO: 5 and the V$_L$ comprises the amino acid sequence shown in SEQ ID NO: 10. In another example, the V$_H$ comprises the amino acid sequence shown in SEQ ID NO: 5 and the V$_L$ comprises the amino acid sequence shown in SEQ ID NO: 15. In another example, the V$_H$ comprises the amino acid sequence shown in SEQ ID NO: 34 and the V$_L$ comprises the amino acid sequence shown in SEQ ID NO: 40 or SEQ ID NO: 45. In another example, the V$_H$ comprises the amino acid sequence shown in SEQ ID NO: 34 and the V$_L$ comprises the amino acid sequence shown in SEQ ID NO: 40. In another example, the V$_H$ comprises the amino acid sequence shown in SEQ ID NO: 34 and the V$_L$ comprises the amino acid sequence shown in SEQ ID NO: 10 or SEQ ID NO: 45. In another example, the V$_H$ comprises the amino acid sequence shown in SEQ ID NO: 65 and the V$_L$ comprises the amino acid sequence shown in SEQ ID NO: 70 or SEQ ID NO: 75. In another example, the V$_H$ comprises the amino acid sequence shown in SEQ ID NO: 65 and the V$_L$ comprises the amino acid sequence shown in SEQ ID NO: 70. In another example, the V$_H$ comprises the amino acid sequence shown in SEQ ID NO: 65 and the V$_L$ comprises the amino acid sequence shown in SEQ ID NO: 75.

In an example, above referenced binding proteins are antibodies. For example, the present disclosure encompasses an antibody having an above referenced combination of CDRs. For example, an antibody of the disclosure can comprise a heavy chain variable region (V$_H$) having a CDR 1 as shown in SEQ ID NO: 1, a CDR2 as shown in SEQ ID NO: 2 and a CDR3 as shown in SEQ ID NO: 3. In another example, the antibody comprises a light chain variable region (V$_L$) having a CDR1 as shown in SEQ ID NO: 6, a CDR2 as shown in SEQ ID NO: 7 and a CDR3 as shown in SEQ ID NO: 8 or SEQ ID NO: 13. In another example, the antibody comprises a light chain variable region (V$_L$) having a CDR1 as shown in SEQ ID NO: 6, a CDR2 as shown in SEQ ID NO: 7 and a CDR3 as shown in SEQ ID NO: 8. In another example, the antibody comprises a light chain variable region (V$_L$) having a CDR1 as shown in SEQ ID NO: 6, a CDR2 as shown in SEQ ID NO: 7 and a CDR3 as shown in SEQ ID NO: 13. Accordingly, in another example, the antibody comprises a V$_H$ having a CDR 1 as shown in SEQ ID NO: 1, a CDR2 as shown in SEQ ID NO: 2 and a CDR3 as shown in SEQ ID NO: 3 and a V$_L$ having a CDR1 as shown in SEQ ID NO: 6, a CDR2 as shown in SEQ ID NO: 7 and a CDR3 as shown in SEQ ID NO: 8. In another example, the antibody comprises a V$_H$ having a CDR 1 as shown in SEQ ID NO: 1, a CDR2 as shown in SEQ ID NO: 2 and a CDR3 as shown in SEQ ID NO: 3 and a V$_L$ having a CDR1 as shown in SEQ ID NO: 6, a CDR2 as shown in SEQ ID NO: 7 and a CDR3 as shown in SEQ ID NO: 13. In an embodiment of these examples, the antibody binds LMA isotype 2 and isotype 3.

In another example, binding proteins encompassed by the present disclosure can comprise the CDRs of above exemplified V$_H$ and V$_L$ combinations. In an example, the CDRs are defined using Kabat. In another example, the CDRs are defined using IMGT.

Referring to binding proteins having an above referenced % sequence identity, in various examples, binding proteins encompassed by the present disclosure can comprise at least one, at least two, at least three, at least four or at least five amino acid substitutions compared with the referenced sequence identifier number. Exemplary substitutions include conservative amino acid substitutions such as those described below in Table A.

TABLE A

| Exemplary substitutions. | |
|---|---|
| Original Residue | Exemplary Substitutions |
| Arg (R) | Lys (K) |
| Glu (E) | Asp (D) |
| Ile (I) | Leu (L); Val (V); Ala (A) |
| Leu (L) | Ile (I); Val (V); Met (M); Ala (A); Phe (F) |
| Lys (K) | Arg (R) |

The term "4G7" is used in the context of the present disclosure to refer to a monoclonal antibody to human free lambda light chain that binds an epitope comprising an amino acid sequences shown in:

SEQ ID NO: 91 (KADGSPVK) and 93 (SHR) (isotype 1);
SEQ ID NO: 92 (KADSSPVK) and 93 (SHR) (isotype 2); or
SEQ ID NO: 92 (KADSSPVK) and 94 (SHK) (isotype 3), 4G7 is commercially available from various suppliers (e.g. Abcam, Cambridge, United Kingdom, #ab54380; Yamasa Corporation, Choshi, Japan, #7642).

In an example, an anti-LMA binding protein encompassed by the present disclosure can bind the same epitope as 4G7. For example, an anti-LMA binding protein encompassed by the present disclosure can bind an epitope comprising an amino acid sequence shown in:
SEQ ID NO: 91 and 93 (lambda isotype 1);
SEQ ID NO: 92 and 93 (lambda isotype 2); or
SEQ ID NO: 92 and 94 (lambda isotype 3).

In another example, an anti-LMA binding protein encompassed by the present disclosure binds an epitope comprising an amino acid sequence shown in:
SEQ ID NO: 91 and 93 (lambda isotype 1);
SEQ ID NO: 92 and 93 (lambda isotype 2); or
SEQ ID NO: 92 and 94 (lambda isotype 3), and does not bind to soluble lambda-light chain.

In another example, the binding protein binds SEQ ID NO: 92 and 93 (lambda isotype 2) and SEQ ID NO: 92 and 94 (lambda isotype 3).

Various lambda light chain isotypes have been reported and these isotypes are defined by amino acid variances in the constant region of the molecule.

Lambda light chain isotypes are expressed at varying frequencies. For example, in subjects with multiple myeloma, about 14% express isotype 1, about 64% express isotype 2 and about 23% express isotype 3. Accordingly, in some examples, it may be desirable to administer an antibody according to the present disclosure which binds one or more or all lambda light chain isotypes. In an example, the binding protein binds lambda isotype 2 and isotype 3. In an example, the binding protein does not bind to isotype 1.

In another example, the binding protein has improved manufacturability compared to 4G7.

Improved manufacturability encompasses post translational modifications or increased chemical stability relating to reduced numbers of deamidation sites, aspartate isomerization sites, oxidation sites such as methionine and tryptophan, free-cysteine thiol groups, N & O-glycosylation sites, the presence of C-terminal lysine and/or isoelectric point.

In an example, the binding protein comprises less asparagine in the $V_H$ and/or $V_L$ compared with 4G7.

In an example, the binding protein comprises less methionine in the $V_H$ and/or $V_L$ compared with 4G7.

In an example, the binding protein comprises less tryptophan in the $V_H$ and/or $V_L$ compared with 4G7.

In an example, the binding protein comprises less aspartic acid in the $V_H$ and/or $V_L$ compared with 4G7.

In an example, the physical stability of the binding protein is greater than 4G7.

Physical stability can include propensity for aggregation in solution. The term "aggregation" is used in the context of the present disclosure to refer to protein self-association, which can occur in multiple environments, from cell culture and fermentation, to isolation, purification and formulation processes. For example, the term "aggregation" can be used when describing the formation of inclusions; the accumulation of protein in "insoluble" fractions following cell fractionation; the appearance of turbidity, protein precipitation or formation of particles in samples; or the formation of small soluble oligomers amongst others.

Accordingly, in the above referenced examples, the physical stability of a binding protein can be based on its physical stability in solution, wherein precipitation of the binding protein from solution indicates that the binding protein has become unstable. To assess physical stability, solutions comprising a binding protein according to the present disclosure or 4G7 can be incubated at 4° C. and assessed visually for precipitation at two weeks, four weeks, 12 weeks, six months and 12 months.

In another example, the binding protein has reduced immunogenicity in a human subject compared to 4G7. For example, a binding protein can have reduced immunogenicity compared to 4G7 when immunogenicity is measure via enzyme-linked immunosorbent assay (ELISA). In another example, a binding protein can have reduced immunogenicity compared to 4G7 when immunogenicity is measure via Surface Plasmon Resonance.

In another example, the binding protein has higher specificity for LMA than 4G7.

In another example, the binding protein has lower cross-reactivity (i.e. the ability of a binding protein to react with similar antigenic sites on different proteins) compared to 4G7. In this example, cross-reactivity of binding proteins can be measured using various methods. In an example, cross-reactivity is assessed via ELISA.

In another example, the binding protein has higher binding affinity for LMA than 4G7.

In another example, the binding protein has a higher binding affinity for LMA relative to light chain than 4G7.

In the above referenced examples, the affinity of a binding protein for LMA can be measured using various methods. In an example, the dissociation constant ($K_D$) or association constant ($K_A$) or equilibrium constant ($K_D$) of a binding protein for LMA is determined. These constants for a binding protein are, in one example, measured by a radio-labelled or fluorescently-labelled LMA-binding assay. This assay equilibrates the binding protein with a minimal concentration of labelled LMA in the presence of a titration series of unlabelled LMA. Following washing to remove unbound LMA, the amount of label is determined.

Affinity measurements can be determined by standard methodology for antibody reactions, for example, immunoassays, surface plasmon resonance (SPR) (Rich and Myszka *Curr. Opin. Biotechnol* 11:54, 2000; Englebienne *Analyst.* 123: 1599, 1998), isothermal titration calorimetry (ITC) or other kinetic interaction assays known in the art.

In one example, the constants are measured by using surface plasmon resonance assays, e.g., using BIAcore surface plasmon resonance (BIAcore, Inc., Piscataway, NJ) with immobilized LMA. Exemplary SPR methods are described in U.S. Pat. No. 7,229,619.

In the other examples, the affinity of a binding protein for LMA can be measured using Isothermal Titration Microcalorimetry.

Binding Protein Production
Recombinant Expression

In one example, a binding protein as described herein is a peptide or polypeptide (e.g., is an antibody or antigen binding fragment thereof). In one example, the binding protein is recombinant.

In the case of a recombinant peptide or polypeptide, nucleic acid encoding same can be cloned into expression vectors, which are then transfected into host cells, such as *E. coli* cells, yeast cells, insect cells, or mammalian cells, such as simian COS cells, Chinese Hamster Ovary (CHO) cells, human embryonic kidney (HEK) cells, or myeloma cells that do not otherwise produce immunoglobulin or antibody protein.

Suitable molecular cloning techniques are known in the art and described, for example in Ausubel et al., (editors), Current Protocols in Molecular Biology, Greene Pub. Associates and Wiley-Interscience (1988, including all updates until present) or Sambrook et al., Molecular Cloning: A Laboratory Manual, Cold Spring Harbor Laboratory Press (1989). A wide variety of cloning and in vitro amplification methods are suitable for the construction of recombinant nucleic acids. Methods of producing recombinant antibodies are also known in the art. See U.S. Pat. No. 4,816,567 or U.S. Pat. No. 5,530,101.

Following isolation, the nucleic acid is inserted operably linked to a promoter in an expression construct or expression vector for further cloning (amplification of the DNA) or for expression in a cell-free system or in cells. Thus, another example of the disclosure provides an expression construct that comprises an isolated nucleic acid of the disclosure and one or more additional nucleotide sequences. Suitably, the expression construct is in the form of, or comprises genetic components of, a plasmid, bacteriophage, a cosmid, a yeast or bacterial artificial chromosome as are understood in the art. Expression constructs may be suitable for maintenance and propagation of the isolated nucleic acid in bacteria or other host cells, for manipulation by recombinant DNA technology and/or for expression of the nucleic acid or a binding protein of the disclosure.

Many vectors for expression in cells are available. The vector components generally include, but are not limited to, one or more of the following: a signal sequence, a sequence encoding the binding protein (e.g., derived from the information provided herein), an enhancer element, a promoter, and a transcription termination sequence. Exemplary signal sequences include prokaryotic secretion signals (e.g., pelB, alkaline phosphatase, penicillinase, Ipp, or heat-stable enterotoxin II), yeast secretion signals (e.g., invertase leader, α factor leader, or acid phosphatase leader) or mammalian secretion signals (e.g., herpes simplex gD signal).

Exemplary promoters active in mammalian cells include cytomegalovirus immediate early promoter (CMV-IE), human elongation factor 1-α promoter (EF1), small nuclear RNA promoters (U1a and U1b), α-myosin heavy chain promoter, Simian virus 40 promoter (SV40), Rous sarcoma virus promoter (RSV), Adenovirus major late promoter, β-actin promoter; hybrid regulatory element comprising a CMV enhancer/β-actin promoter or an immunoglobulin or antibody promoter or active fragment thereof. Examples of useful mammalian host cell lines are monkey kidney CV1 line transformed by SV40 (COS-7, ATCC CRL 1651); human embryonic kidney line (293 or 293 cells subcloned for growth in suspension culture; baby hamster kidney cells (BHK, ATCC CCL 10); or Chinese hamster ovary cells (CHO).

Typical promoters suitable for expression in yeast cells such as for example a yeast cell selected from the group comprising *Pichia pastoris*. *Saccharomyces cerevisiae* and *S. pombe*, include, but are not limited to, the ADH1 promoter, the GAL1 promoter, the GAL4 promoter, the CUP1 promoter, the PHO5 promoter, the nmt promoter, the RPR1 promoter, or the TEF1 promoter.

Means for introducing the isolated nucleic acid or expression construct comprising same into a cell for expression are known to those skilled in the art. The technique used for a given cell depends on the known successful techniques. Means for introducing recombinant DNA into cells include microinjection, transfection mediated by DEAE-dextran, transfection mediated by liposomes such as by using lipofectamine (Gibco, MD, USA) and/or cellfectin (Gibco, MD, USA), PEG-mediated DNA uptake, electroporation and microparticle bombardment such as by using DNA-coated tungsten or gold particles (Agracetus Inc., WI, USA) amongst others.

The host cells used to produce the binding protein (e.g., antibody or antigen binding fragment) may be cultured in a variety of media, depending on the cell type used. Commercially available media such as Ham's F10 (Sigma), Minimal Essential Medium ((MEM), (Sigma), RPMI-1640 (Sigma), and Dulbecco's Modified Eagle's Medium ((DMEM), Sigma) are suitable for culturing mammalian cells. Media for culturing other cell types discussed herein are known in the art.

The skilled artisan will understand from the foregoing description that the present disclosure also provides an isolated nucleic acid encoding a binding protein (e.g., a peptide or polypeptide binding protein or an antibody or antigen binding fragment thereof) of the present disclosure.

The present disclosure also provides an expression construct comprising an isolated nucleic acid of the disclosure operably linked to a promoter. In one example, the expression construct is an expression vector.

In one example, the expression construct of the disclosure comprises a nucleic acid encoding a polypeptide (e.g., comprising a $V_H$) operably linked to a promoter and a nucleic acid encoding another polypeptide (e.g., comprising a $V_L$) operably linked to a promoter.

The disclosure also provides a host cell comprising an expression construct according to the present disclosure.

The present disclosure also provides an isolated cell expressing a binding protein of the disclosure or a recombinant cell genetically-modified to express the binding protein.

Isolation of Proteins

Methods for purifying binding proteins according to the present disclosure are known in the art. Where a peptide or polypeptide is secreted into the medium, supernatants from such expression systems can be first concentrated using a commercially available protein concentration filter, for example, an Amicon or Millipore Pellicon ultrafiltration unit. A protease inhibitor such as PMSF may be included in any of the foregoing steps to inhibit proteolysis and antibiotics may be included to prevent the growth of adventitious contaminants.

Binding protein prepared from cells can be purified using, for example, ion exchange, hydroxyapatite chromatography, hydrophobic interaction chromatography, gel electrophoresis, dialysis, affinity chromatography (e.g., protein A affinity chromatography or protein G chromatography), or any combination of the foregoing. These methods are known in the art and described, for example in WO99/57134 or Ed Harlow and David Lane (editors) Antibodies: A Laboratory Manual, Cold Spring Harbor Laboratory, (1988).

Conjugates

In one example, a binding protein of the present disclosure is conjugated to another compound. The binding protein can be directly or indirectly bound to the compound (e.g., can comprise a linker in the case of indirect binding). Examples of compounds include, a radioisotope (e.g., iodine-131, yttrium-90 or indium-111), a detectable label (e.g., a fluorophore or a fluorescent nanocrystal or quantum dot), a therapeutic compound (e.g., a chemotherapeutic or an anti-inflammatory), a colloid (e.g., gold), a toxin (e.g., ricin or tetanus toxoid), a nucleic acid, an agent that increases the half-life of the compound in a subject (e.g., polyethylene glycol or other water soluble polymer having this activity) and mixtures thereof.

Methods for attaching a drug or other small molecule pharmaceutical to an antibody are well known and can include use of bifunctional chemical linkers such as N-succinimidyl (4-iodoacetyl)-aminobenzoate; sulfosuccinimidyl (4-iodoacetyl)-aminobenzoate; 4-succinimidyl-oxycarbonyl-(2-pyridyldithio) toluene; sulfosuccinimidyl-6-[α-methyl-∀-(pyridyldithiol)-toluamido] hexanoate; N-succinimidyl-3-(−2-pyridyldithio)-proprionate; succinimidyl-6-[3 (-(−2-pyridyldithio)-proprionamido] hexanoate; sulfosuccinimidyl-6-[3 (-(−2-pyridyldithio)-propionamido] hexanoate; 3-(2-pyridyldithio)-propionyl hydrazide, Ellman's reagent, dichlorotriazinic acid, S-(2-thiopyridyl)-L-cysteine, and the like. Further bifunctional linking molecules are discussed in, for example, U.S. Pat. Nos. 5,349,066, 5,618,528, 4,569,789, 4,952,394, and 5,137,877.

The linker can be cleavable or noncleavable. Highly stable linkers can reduce the amount of payload that falls off in circulation, thus improving the safety profile, and ensuring that more of the payload arrives at the target cell. Linkers can be based on chemical motifs including disulfides, hydrazones or peptides (cleavable), or thioethers (noncleavable) and control the distribution and delivery of the active agent to the target cell. Cleavable and noncleavable types of linkers have been proven to be safe in preclinical and clinical trials (see, e.g., Brentuximab vedotin which includes an enzyme-sensitive linker cleavable by cathepsin; and Trastuzumab emtansine, which includes a stable, non-cleavable linker). In an example, the linker is a peptide linker cleavable by Edman degredation (Bąchor, et al., *Molecular diversity*, 17 (3): 605-11 (2013)).

In an example, the binding protein is conjugated to nanoparticles or microparticles (for example as reviewed in Kogan et al., *Nanomedicine (Lond)*. 2: 287-306, 2007). The nanoparticles may be metallic nanoparticles. The particles can be polymeric particles, liposomes, micelles, microbubbles, and other carriers and delivery vehicles known in the art.

Some exemplary compounds that can be conjugated to a binding protein of the present disclosure are listed in Table B.

TABLE B

Compounds useful in conjugation.

| Group | Detail |
| --- | --- |
| Radioisotopes (either directly or indirectly) | $^{123}$I, $^{125}$I, $^{130}$I, $^{133}$I, $^{135}$I, $^{47}$Sc, $^{72}$As, $^{72}$Sc, $^{90}$Y, $^{88}$Y, $^{97}$Ru, $^{100}$Pd, $^{101m}$Rh, $^{101m}$Rh, $^{119}$Sb, $^{128}$Ba, $^{197}$Hg, $^{211}$At, $^{212}$Bi, $^{153}$Sm, $^{169}$Eu, $^{212}$Pb, $^{109}$Pd, $^{111}$In, $^{67}$Gu, $^{68}$Gu, $^{67}$Cu, $^{75}$Br, $^{76}$Br, $^{77}$Br, $^{99m}$Tc, $^{11}$C, $^{13}$N, $^{15}$O, $^{18}$I, $^{188}$Re, $^{203}$Pb, $^{64}$Cu, $^{105}$Rh, $^{198}$Au, $^{199}$Ag or $^{177}$Lu |
| Half-life extenders | Polyethylene glycol |
|  | Glycerol |
|  | Glucose |
| Fluorescent probes | Phycoerythrin (PE) |
|  | Allophycocyanin (APC) |
|  | Alexa Fluor 488 |
|  | Cy5.5 |
| Chemotherapeutics | Taxol |
|  | 5-FU |
|  | Doxorubicin |
|  | Idarubicin |

In one example, a binding protein of the disclosure is conjugated to a chemotherapy agent.

Compositions

Suitably, in compositions or methods for administration of a binding protein according to the present disclosure to a subject, the binding protein is combined with a pharmaceutically acceptable carrier as is understood in the art. In one example, the present disclosure provides a composition (e.g., a pharmaceutical composition) comprising a binding protein of the disclosure combined with a pharmaceutically acceptable carrier. In another example, the disclosure provides a kit comprising a pharmaceutically acceptable carrier suitable for combining or mixing with a binding protein disclosed herein prior to administration to the subject. In this example, the kit may further comprise instructions for use.

In general terms, "carrier" is used to refer to a solid or liquid filler, binder, diluent, encapsulating substance, emulsifier, wetting agent, solvent, suspending agent, coating or lubricant that may be safely administered to a subject, e.g., a human subject. Depending upon the particular route of administration, a variety of acceptable carriers, known in the art may be used, as for example described in Remington's Pharmaceutical Sciences (Mack Publishing Co. N.J. USA, 1991).

For example, suitable carriers may be selected from a group including sugars (e.g. sucrose, maltose, trehalose, glucose), starches, cellulose and its derivatives, malt, gelatine, talc, calcium sulfate, oils inclusive of vegetable oils, synthetic oils and synthetic mono- or di-glycerides, lower alcohols, polyols, alginic acid, phosphate buffered solutions, lubricants such as sodium or magnesium stearate, isotonic saline and pyrogen-free water. In an example, the carrier is not $H_2O$.

In an example, the carrier is compatible with, or suitable for, parenteral administration. Parenteral administration includes any route of administration that is not through the alimentary canal. Examples of parenteral administration include injection, infusion and the like. Examples of administration by injection include intravenous, intra-arterial, intramuscular and subcutaneous injection. In another example, compositions can be delivered via a depot or slow-release formulation which may be delivered intradermally, intramuscularly or subcutaneously.

In an example, an LMA binding protein disclosed herein is utilized for detecting site or sites of cancer. The method typically including administering to a subject in need thereof an effective amount an agent that is detectable using diagnostic imaging or nuclear medicine techniques, and detecting the agent. In such methods, the agent is typically conjugated to the LMA binding protein or encapsulated in a delivery vehicle conjugated with the LMA binding protein. The diagnostic imaging or nuclear medicine technique can be, for example, PET-CT, bone scan, MRI, CT, echocardiography, ultrasound, and x-ray.

In an example, binding proteins and compositions comprising the same can be used in the manufacture of a medicament for the treatment of a condition characterised by aberrant proliferation of LMA-expressing cells such as LMA-expressing cancer. In another example, the present disclosure relates to a binding protein or compositions comprising the same for use in the treatment of a condition. Examples of conditions to be treated are discussed below.

Conditions to be Treated

In an example, the present disclosure encompasses methods of treating an LMA-expressing cancer, the methods comprising administering an anti-LMA binding protein defined herein. For example, the present disclosure encompasses methods of treating B-cell malignancy wherein the malignant B-cells express LMA. In another example, the present disclosure encompasses methods of treating multiple myeloma and related pathologies. The terms "multiple myeloma" or "myeloma" are used in the context of the present disclosure to refer to cancer of plasma cells. In the context of the present disclosure, these terms encompasses secretory myeloma, non-secretory myeloma, light chain only myeloma, smouldering myeloma and related pathologies. Exemplary related pathologies include plasmacytoma, amyloidosis, monoclonal gammopathy of undetermined significance. In an example, the multiple myeloma is lambda-type multiple myeloma.

Accordingly, in an example, the present disclosure encompasses methods of treating amyloidosis. In an example, such methods comprise administering a binding protein disclosed herein with a high affinity for free lambda light chain. For example, a binding protein comprising a $V_H$ having a CDR 1 as shown in SEQ ID NO: 31, a CDR2 as shown in SEQ ID NO: 32 and a CDR3 as shown in SEQ ID NO: 33 and a $V_L$ having a CDR 1 as shown in SEQ ID NO: 36, a CDR2 as shown in SEQ ID NO: 37 and a CDR3 as shown in SEQ ID NO: 38 can be administered. In another example, a binding protein having a $V_H$ comprising an amino acid sequence shown in SEQ ID NO: 34 and a $V_L$ having an amino acid sequence shown in SEQ ID NO: 39 can be administered. In another example, a binding protein comprising a $V_H$ having a CDR 1 as shown in SEQ ID NO: 66, a CDR2 as shown in SEQ ID NO: 67 and a CDR3 as shown in SEQ ID NO: 68 and a $V_L$ having a CDR 1 as shown in SEQ ID NO: 71, a CDR2 as shown in SEQ ID NO: 72 and a CDR3 as shown in SEQ ID NO: 73 can be administered. In another example, a binding protein having a $V_H$ comprising an amino acid sequence shown in SEQ ID NO: 64 and a $V_L$ having an amino acid sequence shown in SEQ ID NO: 74 can be administered. In another example, a binding protein comprising a $V_H$ having a CDR 1 as shown in SEQ ID NO: 61, a CDR2 as shown in SEQ ID NO: 62 and a CDR3 as shown in SEQ ID NO: 63 and a $V_L$ having a CDR 1 as shown in SEQ ID NO: 66, a CDR2 as shown in SEQ ID NO: 67 and a CDR3 as shown in SEQ ID NO: 68 can be administered.

Subjects with multiple myeloma can be characterised into various subject populations. Exemplary populations are described in (Rajkumar et al. 2011).

In an example, a subjects multiple myeloma can be characterised as progressive disease (Rajkumar et al. 2011). Put another way, the methods of the present disclosure relate to the treatment of progressive multiple myeloma in a subject. Exemplary indicators of "progressive disease" include an increase of about 25% from the lowest response value in any one of the following: Serum M-component (absolute increase> or equal to 0.5 g/dL) and/or Urine M-component (absolute increase must be > or equal to 200 mg/24 hr. Other exemplary indicators include definite development of new bone lesions or soft tissue plasmacytomas or definite increase in the size of existing bone lesions or soft tissue plasmacytomas; development of hypercalcemia (corrected serum calcium>11.5 mg/dL) that can be attributed solely to the multiple myeloma. In an example, the subjects multiple myeloma has relapsed and is characterised as progressive disease. In this example, the subjects multiple myeloma can also be refractory to therapy.

In an example, the subjects multiple myeloma has relapsed. "Relapsed myeloma" is used to refer to previously treated myeloma that progresses and requires the initiation of salvage therapy but does not meet criteria for either "primary refractory myeloma".

In another example, the subject has primary refractory myeloma. "Primary refractory myeloma" is used to refer to disease that is nonresponsive in patients who have never achieved a minimal response or better with any therapy.

In another example, the subject has refractory myeloma. The term "refractory myeloma" is used to refer to disease that is nonresponsive while on primary or salvage therapy, or progresses within 60 days of last therapy. In an example, a subjects multiple myeloma is refractory to an anti-cancer therapy. The term "refractory" is used in this context to refer to a line of anti-cancer therapy that is no longer therapeutically effective against a subject's multiple myeloma. For example, a subject treated by the methods of the present disclosure can be refractory to at least one proteasome inhibitor. A "line of therapy" is defined as one or more cycles of a planned treatment program. This may consist of one or more planned cycles of single-agent therapy or combination therapy, as well as a sequence of treatments administered in a planned manner. For example, a planned treatment approach of induction therapy followed by autologous stem cell transplantation, followed by maintenance is considered one line of therapy.

In another example, subjects are refractory to at least two prior lines of therapy. In another example, a subject may be refractory to at least three, at least four, at least five, at least six prior lines of therapy.

In another example, the subject has relapsed and refractory myeloma. "Relapsed and refractory myeloma" is used to refer to disease that is nonresponsive while on salvage therapy, or progresses within 60 days of last therapy in patients who have achieved minimal response (MR) or better at some point previously before then progressing in their disease course.

In an example, the multiple myeloma treated according to the present disclosure is characterised as stable disease at the time of first administration. Put another way, subjects can be in plateau phase at the time of first administration. Exemplary criteria for stable disease can include stabilization of the M-protein without further tumour regression despite continued treatment, few or no symptoms from myeloma and/or no blood transfusion requirement (Blade et al. 1998).

In another example, the methods of the present disclosure can be used to treat B cell lymphoma and macroglobulinemia.

In another example, the methods of the present disclosure can be used to treat POEMS. As used herein "POEMS syndrome" is a rare blood disorder that damages the nerves and affects many other parts of the body. "POEMS" stands for these signs and symptoms: Polyneuropathy: numbness, tingling and weakness in the legs and over time in the hands and difficulty breathing; Organomegaly: enlarged spleen, liver or lymph nodes; Endocrinopathy: abnormal hormone levels that can result in underactive thyroid (hyperthyroidism), diabetes, sexual problems, fatigue, swelling in the limbs and problems with metabolism and other essential functions; Monoclonal plasma-proliferative disorder: abnormal bone marrow cells (plasma cells) that produce a protein that can be found in the bloodstream; Skin changes: more color than normal on the skin, possibly thicker skin and increased facial and/or leg hair.

In another example, binding proteins defined herein can be administered to a subject to treat an autoimmune disorder. In an example, the autoimmune disorder is characterised by aberrant proliferation of plasma cell precursors expressing LMA as membrane free light chain (mFLC). For example, binding proteins defined herein can be administered to a subject to treat an autoimmune disorder such as rheumatoid arthritis, systemic lupus erythematosus, diabetes mellitus, multiple sclerosis, Crohn's disease, immune thrombocytopenic purpura, pemphigis vulgaris, autoimmune urticaria, celiac disease, dermatitis herpetiformis, acute rhematic fever, Grave's disease, myasthenic gravis, Sjogren's syndrome, Goodpasture's syndrome, poststreptococcal glomerulonephritis, contact dermatitis, autoimmune thyroiditis, Hashimoto's thyroiditis, Addison's disease, autoimmune haemo lytic anaemia, pernicious anaemia, vasculitis caused by anti-neutrophil cytoplasmic antibodies (ANCA), polyarteritis nodosa, autoimmune hepatitis, and primary biliary cirrhosis. For example, the methods of the present disclosure can be used to treat rheumatoid arthritis, systemic lupus erythematosus, diabetes mellitus, and multiple sclerosis. Accordingly, in an example, the methods of the present disclosure can be used to treat rheumatoid arthritis. In another example, the present disclosure can be used to treat systemic lupus erythematosus. In another example, binding proteins according to the present disclosure can be used to treat diabetes mellitus. In another example, binding proteins according to the present disclosure can be used to treat multiple sclerosis.

In another example, the binding proteins according to the present disclosure can be used to reduce lambda free light chain levels in a subject (i.e. reduce the amount of lambda light chain in a subject that is not expressed on the cell membrane, e.g. lambda light chain in serum). Such methods comprise administering a binding protein disclosed herein with a high affinity for free lambda light chain. For example, a binding protein comprising a $V_H$ having a CDR 1 as shown in SEQ ID NO: 31, a CDR2 as shown in SEQ ID NO: 32 and a CDR3 as shown in SEQ ID NO: 33 and a $V_L$ having a CDR 1 as shown in SEQ ID NO: 36, a CDR2 as shown in SEQ ID NO: 37 and a CDR3 as shown in SEQ ID NO: 38 can be administered. In another example, a binding protein having a $V_H$ comprising an amino acid sequence shown in SEQ ID NO: 34 and a $V_L$ having an amino acid sequence shown in SEQ ID NO: 39 can be administered. In another example, a binding protein comprising a $V_H$ having a CDR 1 as shown in SEQ ID NO: 66, a CDR2 as shown in SEQ ID NO: 67 and a CDR3 as shown in SEQ ID NO: 68 and a $V_L$ having a CDR 1 as shown in SEQ ID NO: 71, a CDR2 as shown in SEQ ID NO: 72 and a CDR3 as shown in SEQ ID NO: 73 can be administered. In another example, a binding protein having a $V_H$ comprising an amino acid sequence shown in SEQ ID NO: 64 and a $V_L$ having an amino acid sequence shown in SEQ ID NO: 74 can be administered. In another example, a binding protein comprising a $V_H$ having a CDR 1 as shown in SEQ ID NO: 61, a CDR2 as shown in SEQ ID NO: 62 and a CDR3 as shown in SEQ ID NO: 63 and a $V_L$ having a CDR 1 as shown in SEQ ID NO: 66, a CDR2 as shown in SEQ ID NO: 67 and a CDR3 as shown in SEQ ID NO: 68 can be administered.

In another example, the methods of the present disclosure encompass treating an LMA-expressing cancer or other disorder disclosed herein by administering a binding protein of the present disclosure with a high affinity for free lambda light chain in combination with a binding protein of the present disclosure with a low affinity for free lambda light chain. For example, a binding protein having a $V_H$ comprising an amino acid sequence shown in SEQ ID NO: 64 and a $V_L$ having an amino acid sequence shown in SEQ ID NO: 74 can be administered in combination with a binding protein having a $V_H$ comprising an amino acid sequence shown in SEQ ID NO: 4 and a $V_L$ having an amino acid sequence shown in SEQ ID NO: 9. In another example, a binding protein having a $V_H$ comprising an amino acid sequence shown in SEQ ID NO: 64 and a $V_L$ having an amino acid sequence shown in SEQ ID NO: 74 can be administered in combination with a binding protein having a $V_H$ comprising an amino acid sequence shown in SEQ ID NO: 4 and a $V_L$ having an amino acid sequence shown in SEQ ID NO: 9.

Antibodies administered in combination as part of performing the methods of the present disclosure may be administered simultaneously or sequentially.

EXAMPLES

Example 1: Lambda Myeloma Antigen (LMA) on Lambda Multiple Myeloma Cells

To determine the presence of lambda myeloma antigen (LMA) on the surface of lambda multiple myeloma cells, murine monoclonal antibody 4G7 raised against lambda Bence Jones Proteins (BJP) was used in ELISA, Surface Plasmon Resonance (SPR) and Western Blot assays. Mouse monoclonal antibody 4G7 demonstrated pan reactivity against all free lambda light chain BJP and a range of lambda human multiple myeloma cell lines which encompassed the 3 dominant lambda light chain isotypes compared to mouse monoclonal antibody 3D12 (Tables 1 and 2). Its interaction could be inhibited by lambda free light chains and not IgG/lambda, demonstrating the presence of lambda light chains on the cell surface of the lambda human multiple myeloma cell line RPMI8226. 4G7 also detected LMA on lambda multiple myeloma patient derived bone marrow mononuclear cell populations which were positive for CD38 and CD138 as determined by flow cytometric analysis (Table 3). Epitope excision experiments identified two peptides as components of the 4G7 monoclonal antibody epitope on lambda multiple myeloma cell line (FIG. 1).

TABLE 1

Murine monoclonal antibody 4G7 binds all lambda light chains in SPR assays

| Lambda BJP | Biocore Response (RU) | | | |
|---|---|---|---|---|
| | 4G7 | | 3D12 | |
| Lam034 | 298 | +++ | 16 | − |
| Lam134c | 161 | ++ | 11 | − |
| Lam788a | 49 | + | 15 | − |
| Lam885 | 243 | +++ | 350 | +++ |
| Lam893c | 110 | ++ | 150 | ++ |
| MOS | −5 | − | 14 | − |
| IgGlambda | 30 | −/+ | 13 | − |

TABLE 2

Murine monoclonal antibody 4G7 binds all lambda light chains in ELISA assays

| Lambda BJP | ELISA Response | | | |
|---|---|---|---|---|
| | 4G7 | | 3D12 | |
| Lam034 | 1.416 | +++ | −0.016 | − |
| Lam134c | 1.328 | +++ | −0.024 | − |
| Lam788a | 1.399 | +++ | −0.027 | − |
| Lam885 | 1.326 | +++ | 0.890 | ++ |
| Lam893c | 1.327 | +++ | 0.509 | + |
| MOS | 1.277 | +++ | 0.001 | − |

TABLE 2-continued

Murine monoclonal antibody 4G7 binds all lambda light chains in ELISA assays

| Lambda BJP | ELISA Response | | | |
|---|---|---|---|---|
| | 4G7 | | 3D12 | |
| IgGlambda | 0.532 | + | 0.117 | −/+ |
| κBJP | 0.000 | − | −0.011 | − |

TABLE 3

Murine monoclonal antibody 4G7 detects LMA on primary bone marrow cells from lambda multiple myeloma patients.

| Patient | Isotype | Free light chain (mg/L) | % PC | LMA | Comments |
|---|---|---|---|---|---|
| 1 | NA | NA | 6 | ND | CD45+CD38+ cells detected |
| 2 | NA | 142 | 30 | + | Stained for LMA only |
| 3 | LC MM | 1372.5 | 18 | + | CD45−CD38+ cells detected |
| 4 | G | NA | 6 | ND | CD45−CD38+CD138+ cells detected |
| 5 | A | 61.6 | 13 | + | CD45−CD38+CD138+ cells detected |

Abbreviations. NA: not available; ND: not detected; FLC: free light chain; % PC: percentage bone marrow plasma.

Example 2: Generation of Human Anti-LMA Antibodies

HuMAb-Mice (Medarex) were immunized with Ig free lambda-light chains and lambda myeloma antigen (LMA) positive cell lines. Human anti-LMA antibodies were screened for binding to Ig free lambda-light chains and Ig associated lambda-light chains using ELISA to identify LMA specific candidates. Human anti-LMA antibodies were purified and characterized by binding to LMA positive cell lines using flow cytometry and affinity for Ig free lambda-light chains using Surface Plasmon Resonance (SPR) analysis. Human anti-LMA antibody candidates identified were 1A11, 7F11, 10B3, 18E8, 18E11, 18F9.

Example 3: Human Anti-LMA Antibodies Bind Lambda Light Chains

To determine the binding affinity of anti-LMA antibodies to lambda-light chain, Surface Plasmon Resonance (SPR) experiments were performed. Anti-human Ig light chain was immobilised on BIACore CM5 chips and used to capture the human anti-LMA antibody candidates (20 µg/mL). The tested lambda-light chains were injected (20 µL/min) following the candidate capture and SPR was determined (relative units: RU).

Human anti-LMA antibodies (clones 1A11, 7F11, 10B3, 18E8, 18E11 and 18F9) demonstrated high and selective affinity to purified lambda-light chains BJP but not κBJP (KAP960M) (FIG. 2A), cynomologus monkey lambda-light chains (CYNO1, CYNO3), and supernatant from lambda-light chain transfected HEK cells, LP-1 lambda-light chain isolate (LP-1 ISO) and RPMI-8226 lambda-light chain isolate (RPMI-8226 ISO) (FIG. 3). Similarly, human anti-LMA antibodies (6A1, 13H3 and 4A1) demonstrated high and selective affinity to human multiple myeloma cell lines expressing lambda-light chain isotypes and not to kappa-light chain expressing JJN3 cell line (FIG. 4) while clones 18E8, 7F11 and 18F9 demonstrated selective affinity to commercial lambda-light chain (Bethyl) (FIG. 2B).

Human anti-LMA antibody 7F11 demonstrated lower selective affinity to purified lambda-light chains BJP compared to other clones tested (FIG. 2A, 2B) and demonstrated low affinity to cynomologus monkey lambda-light chains (CYNO1, CYNO3; FIG. 3) and supernatant from lambda-light chain transfected HEK cells, LP-1 lambda-light chain isolate (LP-1 ISO) and RPMI-8226 lambda-light chain isolate (RPMI-8226 ISO) (FIG. 4).

Example 4: Human Anti-LMA Antibodies Bind LMA Positive Human Myeloma Cell Lines To determine the binding of human anti-LMA antibodies to human myeloma cell lines expressing LMA of divergent lambda isotypes, flow cytometric analysis was performed.

Human myeloma cell lines ($5 \times 10^5$ cells) were stained with a solution of human anti-LMA antibody (50 µg/mL) or mouse anti-LMA antibody 4G7. Human anti-LMA antibodies (1A11, 7F11, 10B3, 18E8, 18E11 and 18F9) demonstrated selective staining of all tested human myeloma cell lines (RPMI-8226 (lambda isotype 2), U266 (lambda isotype 2), JJN3 (kappa), OPM-2 (lambda isotype 3)), did not (or weakly) stained JJN3 (kappa) cell line (FIG. 5A) and demonstrated weak staining against KMS-18 (lambda isotype 1) (FIG. 5B). Human anti-LMA antibodies (6A1, 4A1 and 13H3) demonstrated low staining of all tested LMA positive human myeloma cell lines.

Example 5: Antibody Dependent Cellular Cytotoxicity (ADCC)

Peripheral blood mononuclear cell (PMBC) preparations or specific cell populations such as natural killer (NK) cells or monocytes contained with PMBC preparations were analysed in ADCC assays. Blood was overlaid on Ficoll, the gradient was centrifuged and PBMCs were collected from the interface of the gradient.

Specific cell populations were isolated from PMBC preparations generated using magnetically labelled antibody preparations (Miltenyi Biotec, Germany) to deplete undesired cells. Effector and target cells were mixed and incubated in RPMI supplemented with 10% fetal calf serum at 37° C. for 16 hours. Degree of cell lysis was determined by measuring the level of intracellular lactate dehydrogenase (LDH) released (CytoTox-ONE Homogenous Membrane Integrity Assay Kit; Promega, USA).

Human anti-LMA antibodies showed varying degree of effector function with clone 10B3 demonstrating the strongest ADCC amongst the antibodies tested (FIG. 6).

Example 6: Complement Dependent Cytotoxicity (CDC)

Target cells were incubated in the presence of complement (either purified or human serum containing complement) and antibody in RPMI supplemented with 10% fetal calf serum for between 30 minutes to 12 hours at 37° C. Degree of cell lysis was determined by measuring the level of intracellular lactate dehydrogenase (LDH) released (CytoTox-ONE Homogenous Membrane Integrity Assay Kit; Promega, USA). Metabolic state of cells was measured using Alamar Blue (Invitrogen, USA).

Human anti-LMA antibodies showed varying degree of effector function with clone 10B3 demonstrating the strongest CDC activity amongst the antibodies tested (FIG. 7).

Example 7: Human Anti-LMA Antibody 7F11 Selective for LMA and not Free Lambda-Light Chains Human anti-LMA antibodies 10B3 and 18E8 bind to both soluble lambda-light chains and LMA positive cells and can promote ADCC and CDC when used to target lambda expressing RPMI8226 cells (Table 5). Interestingly, human anti-LMA antibody 7F11 is selective for LMA (membrane bound light chain) and can promote ADCC and CDC when used to target lambda expressing RPMI8226 cells but does not bind to soluble lambda-light chains (Table 5). Analysis of 7F11 sequence revealed unique heavy chain CDRs compared to other human antibodies tested that bound free light chain (FIG. 8). The different binding characteristics between human anti-LMA antibodies 7F11 compared to 10B3 and 18E8 allows for their selective use to deplete free lambda light chain and/or target LMA positive cells.

TABLE 5

Human anti-LMA antibody affinity to lambda-light chains or LMA positive cells.

| Clone Name | Binds to LP-1 (λ isotype 1) | ADCC RPMI8226 (λ isotype 2) | CDC RPMI8226 (λ isotype 2) | Binds soluble λ light chains | Binds LMA+ cell lines |
|---|---|---|---|---|---|
| 10B3 | Y | Y | Y | Y | Y |
| 1A11 | Y | Y | Y | Y | Y |
| 18E8 | Y | N | Y | Y | Y |
| 18E11 | Y | Y | P | Y | Y |
| 18F9 | Y | N | Y | Y | Y |
| 7F11 | N | Y | Y | N | Y |
| 4A1 | N | P | Y | N | N |
| 6A1 | N | P | Y | N | N |
| 13H3 | N | Y | Y | Y | N |
| 13B5 | N | P | P | P | P |

Abbreviations: Y: yes, strong affinity; N: no, weak affinity; P: possible, further evaluation required.
Table 5 notes that 7F11 doesn't bind to cells that express lambda light chain isotype 1 whereas 4G7, 18E8 and 10B3 do.

Table 5 notes that 7F11 doesn't bind to cells that express lambda light chain isotype 1 whereas 4G7, 18E8 and 10B3 do.

Example 8: Human Anti-LMA Antibody Staining in Human Tissue

Human LP-1 (multiple myeloma) cells, JJN3 (plasma cell leukaemia), human tonsil specimens and human cerebellum specimens were contacted with 10B3 and 7F11 antibodies and antibody staining was compared against control antibody staining from HuIgG1-lambda.

LP-1 cells express LMA isotype 1. 10B3 stained LP-1 cells while 7F11 did not stain LP-1 cells. These results are consistent with the above results which show that 10B3 binds lambda isotype 1 while 7F11 does not. No staining of JJN3 cells were observed with either 10B3 or 7F11.

Tonsils are the first sites where microbial and environmental antigens are managed in the body and therefore house lymphoid cells (About 55% of lymphoid cells are B cells). Weak to strong staining of rare mononuclear cells in follicular germinal centres, interfollicular germinal centres and interfollicular areas was observed with 10B3 and 7F11 (FIG. 9 and FIG. 10; 10B3 stained human tonsil with greater affinity that 7F11). These results confirm that both 10B3 and 7F11 can bind to cells expressing LMA in humans.

Importantly, no staining of human cerebellum was observed for 10B3 or 7F11. Human cerebellum is known to be an effective control for assessing non-specific binding. The lack of staining by both 10B3 and 7F11 highlights the specificity of these antibodies for LMA and reduces the risk of non-specific binding in-vivo.

Example 9: Anti-LMA Antibody Affinity

Anti-human Fc IgG was immobilized onto a CM5 sensor chip (Protein A; Fc2 was captured with antibodies and Fc1 was set as Blank). Anti-LMA antibody (7F11-VL1; 10B3-VL1; 10B3-VL2) was flowed over the chip surface (running buffer: 1x HBS-EP+ (10 mM HEPES, 150 mM NaCl, 3 mM EDTA, 0.05% P20, pH 7.4) @ 25 degrees Celsius and binding characteristics were recorded using Biacore 8k. Assay characteristics are summarised in Table 6. Affinity measurements are shown in Table 7.

10B3-VL1 bound with high affinity to all lambda free light chain antigens. 7F11 only bound to Sigma, 134c and 788a lambda free light chain antigens but with low affinity. These findings are in keeping with example 7 which shows that 7F11 is selective for LMA and not free lambda-light chains. 10B3-VL2 didn't bind to any lambda light chains suggesting that changes to the J gene of this antibody abolished affinity for lambda free light chain.

Importantly, no binding to Kappa light chain was observed for any of the antibodies tested further confirming specificity of these antibodies for lambda light chain.

In summary, 7F11 has no/low affinity binding to soluble lambda light chains but does bind to LMA+ cell lines with isotype 2 and 3. In contrast, 10B3-VL1 binds to all soluble lambda light chains with a high affinity and binds to all LMA+ cell lines (isotypes 1, 2 and 3). 10B3-VL2 which has a different J gene to 10B3-VL1, doesn't bind to soluble lambda light chains.

TABLE 6

Assay characteristics

| Capture | |
|---|---|
| Ligand | Antibodies |
| Concentration (ug/mL) | 2 |
| Capture time (s) | 30 |
| Flow rate(μl/min) | 10 |
| Association & Dissociation | |
| Association contact time(s) | 180 |
| Dissociation contact time(s) | 600 |
| Flow rate(μl/min) | 30 |
| Sample concentrations(nM) | 3.125, 6.25, 12.5, 25, 50, 100 |
| Regeneration | 10 mM glycine pH 1.5, 30 s |

TABLE 7

Affinity measurements

Binding to Lambda Free Light Chains-$K_D$ (M)

| Hybridoma Clone | MyBio | Sigma | 134c | 885 | 893c | 788a | Kappa LC |
|---|---|---|---|---|---|---|---|
| 7F11-VL1 | None | $1.44 \times 10^{-7}$ | $3.2 \times 10^{-7}$ | None | None | $3.63 \times 10^{-7}$ | None |
| 10B3-VL1 | $4.37 \times 10^{-11}$ | $5.22 \times 10^{-10}$ | $4.53 \times 10^{-11}$ | $7.07 \times 10^{-11}$ | $4.01 \times 10^{-11}$ | $1.1 \times 10^{-10}$ | None |
| 10B3-VL2 | None | None | None | None | None | None | None |

It will be appreciated by persons skilled in the art that numerous variations and/or modifications may be made to the disclosure as shown in the specific embodiments without departing from the spirit or scope of the disclosure as broadly described. The present embodiments are, therefore, to be considered in all respects as illustrative and not restrictive.

All publications discussed above are incorporated herein in their entirety.

Any discussion of documents, acts, materials, devices, articles or the like which has been included in the present specification is solely for the purpose of providing a context for the present disclosure. It is not to be taken as an admission that any or all of these matters form part of the prior art base or were common general knowledge in the field relevant to the present disclosure as it existed before the priority date of each claim of this application.

The present application claims priority from AU 2018900534 filed 20 Feb. 2018, the entire contents of which are incorporated herein by reference.

REFERENCES

Adams et al. (1993) Cancer Res. 53:4026
Airoldi, et al. (2008) Blood, 112(3):750-759
Ausubel et al., (editors), Current Protocols in Molecular Biology, Greene Pub.
Associates and Wiley-Interscience (1988, including all updates until present)
AHo (Honegger A, Plhckthun A (2001) J Mol Biol 309: 657-670
Bachor, et al., *Molecular diversity*, 17 (3): 605-11 (2013)
Blade et al. 1998
Chothia (Chothia C, Lesk AM (1987), J Mal Biol 196: 901-917
Chothia, et al. (1989), Nature 342: 877-883
Gruber et al. (1994) J. Immunol.: 5368
Ed Harlow and David Lane (editors) Antibodies: A Laboratory Manual, Cold Spring Harbor Laboratory, (1988)
Hollinger et al., 1993, supra
Hu et al. (1996) Cancer Res. 56:3055
Kogan et al., *Nanomedicine* (*Lond*). 2: 287-306, 2007
Kostelny et al. (1992) J Immunol 148:1547
Kuby, J., Immunology, $3^{rd}$ Ed., W.H. Freeman & Co., New York (1998)
Lefranc, et al. (2003), Dev Comp Immunol 27: 55-77
McCartney, et al. (1995) Protein Eng. 8:301
Novotny et al., Proc Natl Acad Sci USA 88: 8646-8650, 1991
Pack and Pluckthun (1992) Biochemistry 31:1579
Pierce Catalogue and Handbook, 1994-1995 (Pierce Chemical Co., Rockford, Ill.)
Rajkumar et al. 2011
Remington's Pharmaceutical Sciences (Mack Publishing Co. N.J. USA, 1991)
Rich and Myszka *Curr. Opin. Biotechnol* 11:54, 2000; Englebienne *Analyst.* 123: 1599, 1998
Sambrook et al., Molecular Cloning: A Laboratory Manual, Cold Spring Harbor Laboratory Press (1989)
Wang, et al. (2014) Anticancer Drugs, 25(3): 282-288
Zhu et al. (1997) Protein Sci 6:781

The invention claimed is:

1. An anti LMA binding protein having an antigen binding domain that binds to LMA, the binding protein comprising:
   a $V_H$ comprising a CDR1 having the amino acid sequence of SEQ ID NO: 1, a CDR2 having the amino acid sequence of SEQ ID NO: 2 and a CDR3 having the amino acid sequence of SEQ ID NO: 3; and,
   a first $V_L$ comprising a CDR1 having the amino acid sequence of SEQ ID NO: 6, a CDR2 having the amino acid sequence of SEQ ID NO: 7, and a CDR3 having the amino acid sequence of SEQ ID NO: 8; or,
   a second $V_L$ comprising a CDR1 having the amino acid sequence of SEQ ID NO: 11, a CDR2 having the amino acid sequence of SEQ ID NO: 12, and a CDR3 having the amino acid sequence of SEQ ID NO: 13.

2. The binding protein of claim 1, wherein the $V_H$ comprises the amino acid sequence of SEQ ID NO: 4.

3. The binding protein of claim 1, wherein the $V_L$ comprises an amino acid sequence of SEQ ID NO: 9 or SEQ ID NO: 14.

4. The binding protein of claim 1, wherein the $V_L$ comprises the amino acid sequence of SEQ ID NO: 9.

5. The binding protein of claim 1, which is an antibody.

6. A composition comprising a pharmaceutical carrier and the binding protein of claim 1.

* * * * *

SEQUENCE LISTING

```
Sequence total quantity: 94
SEQ ID NO: 1           moltype = AA  length = 5
FEATURE                Location/Qualifiers
REGION                 1..5
                       note = 7F11 heavy chain CDR1 amino acid sequence
source                 1..5
                       mol_type = protein
                       organism = synthetic construct
SEQUENCE: 1
SYAMS                                                                      5

SEQ ID NO: 2           moltype = AA  length = 17
FEATURE                Location/Qualifiers
REGION                 1..17
                       note = 7F11 heavy chain CDR2 amino acid sequence
source                 1..17
                       mol_type = protein
                       organism = synthetic construct
SEQUENCE: 2
AINNSGGSTY YADSVKG                                                        17

SEQ ID NO: 3           moltype = AA  length = 12
FEATURE                Location/Qualifiers
REGION                 1..12
```

```
                        note = 7F11 heavy chain CDR3 amino acid sequence
source                  1..12
                        mol_type = protein
                        organism = synthetic construct
SEQUENCE: 3
DQGWGPLNWF DP                                                          12

SEQ ID NO: 4            moltype = AA   length = 121
FEATURE                 Location/Qualifiers
REGION                  1..121
                        note = 7F11 heavy chain frame work amino acid sequence
source                  1..121
                        mol_type = protein
                        organism = synthetic construct
SEQUENCE: 4
EVQLLESGGG LVQPGGSLRL SCAASGFTFS SYAMSWVRQA PGKGLEWVSA INNSGGSTYY       60
ADSVKGRFTI SRDNSKNTLY LQMNSLRAED TAVYYCAKDQ GWGPLNWFDP WGQGTLVTVS      120
S                                                                     121

SEQ ID NO: 5            moltype = AA   length = 470
FEATURE                 Location/Qualifiers
REGION                  1..470
                        note = 7F11 heavy chain full length amino acid sequence
source                  1..470
                        mol_type = protein
                        organism = synthetic construct
SEQUENCE: 5
MEFGLSWLFL VAILKGVQCE VQLLESGGGL VQPGGSLRLS CAASGFTFSS YAMSWVRQAP       60
GKGLEWVSAI NNSGGSTYYA DSVKGRFTIS RDNSKNTLYL QMNSLRAEDT AVYYCAKDQG      120
WGPLNWFDPW GQGTLVTVSS ASTKGPSVFP LAPSSKSTSG GTAALGCLVK DYFPEPVTVS      180
WNSGALTSGV HTFPAVLQSS GLYSLSSVVT VPSSSLGTQT YICNVNHKPS NTKVDKRVEP      240
KSCDKTHTCP PCPAPELLGG PSVFLFPPKP KDTLMISRTP EVTCVVVDVS HEDPEVKFNW      300
YVDGVEVHNA KTKPREEQYN STYRVVSVLT VLHQDWLNGK EYKCKVSNKA LPAPIEKTIS      360
KAKGQPREPQ VYTLPPSRDE LTKNQVSLTC LVKGFYPSDI AVEWESNGQP ENNYKTTPPV      420
LDSDGSFFLY SKLTVDKSRW QQGNVFSCSV MHEALHNHYT QKSLSLSPGK                 470

SEQ ID NO: 6            moltype = AA   length = 11
FEATURE                 Location/Qualifiers
REGION                  1..11
                        note = 7F11 light chain 1 CDR1 amino acid sequence
source                  1..11
                        mol_type = protein
                        organism = synthetic construct
SEQUENCE: 6
RASQGISSWL A                                                           11

SEQ ID NO: 7            moltype = AA   length = 7
FEATURE                 Location/Qualifiers
REGION                  1..7
                        note = 7F11 light chain 1 CDR2 amino acid sequence
source                  1..7
                        mol_type = protein
                        organism = synthetic construct
SEQUENCE: 7
AASSLQS                                                                 7

SEQ ID NO: 8            moltype = AA   length = 9
FEATURE                 Location/Qualifiers
REGION                  1..9
                        note = 7F11 light chain 1 CDR3 amino acid sequence
source                  1..9
                        mol_type = protein
                        organism = synthetic construct
SEQUENCE: 8
QQYNSHPRT                                                               9

SEQ ID NO: 9            moltype = AA   length = 107
FEATURE                 Location/Qualifiers
REGION                  1..107
                        note = 7F11 light chain 1 frame work amino acid sequence
source                  1..107
                        mol_type = protein
                        organism = synthetic construct
SEQUENCE: 9
DIQMTQSPSS LSASVGDRVT ITCRASQGIS SWLAWYQQKP EKAPKSLIYA ASSLQSGVPS       60
RFSGSGSGTD FTLTISSLQP EDFATYYCQQ YNSHPRTFGQ GTKVEIK                   107

SEQ ID NO: 10           moltype = AA   length = 236
FEATURE                 Location/Qualifiers
```

```
REGION                          1..236
                                note = 7F11 light chain 1 full length amino acid sequence
source                          1..236
                                mol_type = protein
                                organism = synthetic construct
SEQUENCE: 10
MDMRVLAQLL GLLLLCFPGA RCDIQMTQSP SSLSASVGDR VTITCRASQG ISSWLAWYQQ    60
KPEKAPKSLI YAASSLQSGV PSRFSGSGSG TDFTLTISSL QPEDFATYYC QQYNSHPRTF   120
GQGTKVEIKR TVAAPSVFIF PPSDEQLKSG TASVVCLLNN FYPREAKVQW KVDNALQSGN   180
SQESVTEQDS KDSTYSLSST LTLSKADYEK HKVYACEVTH QGLSSPVTKS FNRGEC       236

SEQ ID NO: 11                   moltype = AA  length = 11
FEATURE                         Location/Qualifiers
REGION                          1..11
                                note = 7F11 light chain 2 CDR1 amino acid sequence
source                          1..11
                                mol_type = protein
                                organism = synthetic construct
SEQUENCE: 11
RASQGISSWL A                                                         11

SEQ ID NO: 12                   moltype = AA  length = 7
FEATURE                         Location/Qualifiers
REGION                          1..7
                                note = 7F11 light chain 2 CDR2 amino acid sequence
source                          1..7
                                mol_type = protein
                                organism = synthetic construct
SEQUENCE: 12
AASSLQS                                                               7

SEQ ID NO: 13                   moltype = AA  length = 7
FEATURE                         Location/Qualifiers
REGION                          1..7
                                note = 7F11 light chain 2 CDR3 amino acid sequence
source                          1..7
                                mol_type = protein
                                organism = synthetic construct
SEQUENCE: 13
QQYNSYP                                                               7

SEQ ID NO: 14                   moltype = AA  length = 105
FEATURE                         Location/Qualifiers
REGION                          1..105
                                note = 7F11 light chain 2 frame work amino acid sequence
source                          1..105
                                mol_type = protein
                                organism = synthetic construct
SEQUENCE: 14
DIQMTQSPSS LSASVGDRVT ITCRASQGIS SWLAWYQQKP EKAPKSLIYA ASSLQSGVPS    60
RFSGSGSGTD FTLTISSLQP EDFATYYCQQ YNSYPFGGGT KVEIK                   105

SEQ ID NO: 15                   moltype = AA  length = 234
FEATURE                         Location/Qualifiers
REGION                          1..234
                                note = 7F11 light chain 2 full length amino acid sequence
source                          1..234
                                mol_type = protein
                                organism = synthetic construct
SEQUENCE: 15
MDMRVLAQLL GLLLLCFPGA RCDIQMTQSP SSLSASVGDR VTITCRASQG ISSWLAWYQQ    60
KPEKAPKSLI YAASSLQSGV PSRFSGSGSG TDFTLTISSL QPEDFATYYC QQYNSYPFGG   120
GTKVEIKRTV AAPSVFIFPP SDEQLKSGTA SVVCLLNNFY PREAKVQWKV DNALQSGNSQ   180
ESVTEQDSKD STYSLSSTLT LSKADYEKHK VYACEVTHQG LSSPVTKSFN RGEC         234

SEQ ID NO: 16                   moltype = DNA  length = 30
FEATURE                         Location/Qualifiers
misc_feature                    1..30
                                note = 7F11 heavy chain CDR1 DNA sequence
source                          1..30
                                mol_type = other DNA
                                organism = synthetic construct
SEQUENCE: 16
ggattcacct ttagcagcta tgccatgagc                                      30

SEQ ID NO: 17                   moltype = DNA  length = 51
FEATURE                         Location/Qualifiers
misc_feature                    1..51
                                note = 7F11 heavy chain CDR2 DNA sequence
```

| | | |
|---|---|---|
| source | 1..51 | |
| | mol_type = other DNA | |
| | organism = synthetic construct | |
| SEQUENCE: 17 | | | gctattaata atagtggtgg tagcacatac tacgcagact ccgtgaaggg c         51

| | | |
|---|---|---|
| SEQ ID NO: 18 | moltype = DNA   length = 36 | |
| FEATURE | Location/Qualifiers | |
| misc_feature | 1..36 | |
| | note = 7F11 heavy chain CDR3 DNA sequence | |
| source | 1..36 | |
| | mol_type = other DNA | |
| | organism = synthetic construct | |
| SEQUENCE: 18 | | | gatcagggct ggggacccct caactggttc gacccc                          36

| | | |
|---|---|---|
| SEQ ID NO: 19 | moltype = DNA   length = 363 | |
| FEATURE | Location/Qualifiers | |
| misc_feature | 1..363 | |
| | note = 7F11 heavy chain frame work DNA sequence | |
| source | 1..363 | |
| | mol_type = other DNA | |
| | organism = synthetic construct | |
| SEQUENCE: 19 | | | gaggtgcagc tgttggagtc tgggggaggc ttggtacagc ctgggggtc cctgagactc  60
tcctgtgcag cctctggatt cacctttagc agctatgcca tgagctgggt ccgccaggct 120
ccagggaagg ggctgagtg gtctcagct attaataata gtggtggtag cacatactac 180
gcagactccg tgaagggccg gttcaccatc tccagagaca attccaagaa cacgctgtat 240
ctgcaaatga acagcctgag agccgaggac acggccgtat attactgtgc gaaagatcag 300
ggctggggac ccctcaactg gttcgacccc tggggccagg gaaccctggt caccgtctcc 360
tca                                                              363

| | | |
|---|---|---|
| SEQ ID NO: 20 | moltype = DNA   length = 1410 | |
| FEATURE | Location/Qualifiers | |
| misc_feature | 1..1410 | |
| | note = 7F11 heavy chain full length DNA sequence | |
| source | 1..1410 | |
| | mol_type = other DNA | |
| | organism = synthetic construct | |
| SEQUENCE: 20 | | | atggagtttg ggctgagctg gcttttctt gtggctattt taaaaggtgt ccagtgtgag  60
gtgcagctgt tggagtctgg gggaggcttg gtacagcctg gggggtccct gagactctc 120
tgtgcagcct ctggattcac ctttagcagc tatgccatga gctgggtccg ccaggctcca 180
gggaaggggc tggagtgggt ctcagctatt aataatagtg gtggtagcac atactacgca 240
gactccgtga agggccggtt caccatctcc agagacaatt ccaagaacac gctgtatctg 300
caaatgaaca gcctgagagc cgaggacacg gccgtatatt actgtgcgaa agatcagggc 360
tggggacccc tcaactggtt cgaccccttgg ggccaggga accctggtca cgtctcctca 420
gcctccacca aggccatc ggtcttccc ctggcaccct cctccaagag cacctctggg 480
ggcacagcgg ccctgggctg cctggtcaag gactacttcc ccgaaccggt gacggtgtcg 540
tggaactcag gcgccctgac cagcggcgtg cacaccttcc cggctgtcct acagtcctca 600
ggactctact ccctcagcag cgtggtgacc gtgccctcca gcagcttggg cacccagacc 660
tacatctgca acgtgaatca caagcccagc aacaccaagg tggacaagag agttgagccc 720
aaatcttgtg acaaaactca cacatgccca ccgtgcccag cacctgaact cctggggga 780
ccgtcagtct tcctcttccc cccaaaaccc aaggacaccc tcatgatctc ccggacccct 840
gaggtcacat gcgtggtggt ggacgtgagc cacgaagacc ctgaggtcaa gttcaactgg 900
tacgtggacg gcgtggaggt gcataatgcc aagacaaagc cgcgggagga gcagtacaac 960
agcacgtacc gtgtggtcag cgtcctcacc gtcctgcacc aggactggct gaatggcaag 1020
gagtacaagt gcaaggtctc caacaaagcc ctcccagccc ccatcgagaa aaccatctcc 1080
aaagccaaag ggcagccccg agaaccacag gtgtacaccc tgccccccatc ccgggatgag 1140
ctgaccaaga accaggtcag cctgacctgc ctggtcaaag gcttctatcc cagcgacatc 1200
gccgtggagt gggagagcaa tgggcagccg gagaacaact acaagaccac gcctcccgtg 1260
ctggactccg acggctcctt cttcctctac agcaagctca ccgtggacaa gagcaggtgg 1320
cagcagggga acgtcttctc atgctccgtg atgcatgagg ctctgcacaa ccactacacg 1380
cagaagagcc tctccctgtc tccgggtaaa                                 1410

| | | |
|---|---|---|
| SEQ ID NO: 21 | moltype = DNA   length = 33 | |
| FEATURE | Location/Qualifiers | |
| misc_feature | 1..33 | |
| | note = 7F11 light chain 1 CDR1 DNA sequence | |
| source | 1..33 | |
| | mol_type = other DNA | |
| | organism = synthetic construct | |
| SEQUENCE: 21 | | | cgggcgagtc aggtattag cagctggtta gcc                              33

| | | |
|---|---|---|
| SEQ ID NO: 22 | moltype = DNA   length = 21 | |
| FEATURE | Location/Qualifiers | |
| misc_feature | 1..21 | |
| | note = 7F11 light chain 1 CDR2 DNA sequence | |

```
source                  1..21
                        mol_type = other DNA
                        organism = synthetic construct
SEQUENCE: 22
gctgcatcca gtttgcaaag t                                             21

SEQ ID NO: 23           moltype = DNA  length = 27
FEATURE                 Location/Qualifiers
misc_feature            1..27
                        note = 7F11 light chain 1 CDR3 DNA sequence
source                  1..27
                        mol_type = other DNA
                        organism = synthetic construct
SEQUENCE: 23
caacagtata atagtcaccc tcggacg                                       27

SEQ ID NO: 24           moltype = DNA  length = 321
FEATURE                 Location/Qualifiers
misc_feature            1..321
                        note = 7F11 light chain 1 frame work DNA sequence
source                  1..321
                        mol_type = other DNA
                        organism = synthetic construct
SEQUENCE: 24
gacatccaga tgacccagtc tccatcctca ctgtctgcat ctgtaggaga cagagtcacc    60
atcacttgtc gggcgagtca gggtattagc agctggttag cctggtatca gcagaaacca   120
gagaaagccc ctaagtccct gatctatgct gcatccagtt tgcaaagtgg ggtcccatca   180
aggttcagcg gcagtggatc tgggacagat ttcactctca ccatcagcag cctgcagcct   240
gaagattttg caacttatta ctgccaacag tataatagtc accctcggac gttcggccaa   300
gggaccaagg tggaaatcaa a                                             321

SEQ ID NO: 25           moltype = DNA  length = 708
FEATURE                 Location/Qualifiers
misc_feature            1..708
                        note = 7F11 light chain 1 full length DNA sequence
source                  1..708
                        mol_type = other DNA
                        organism = synthetic construct
SEQUENCE: 25
atggacatga gggtcctcgc tcagctcctg gggctcctgc tgctctgttt cccaggtgcc    60
agatgtgaca tccagatgac ccagtctcca tcctcactgt ctgcatctgt aggagacaga   120
gtcaccatca cttgtcgggc gagtcagggt attagcagct ggttagcctg gtatcagcag   180
aaaccagaga aagcccctaa gtccctgatc tatgctgcat ccagtttgca aagtggggtc   240
ccatcaaggt tcagcggcag tggatctggg acagatttca ctctcaccat cagcagcctg   300
cagcctgaag attttgcaac ttattactgc caacagtata atagtcaccc tcggacgttc   360
ggccaaggga ccaaggtgga aatcaaacga actgtggctg caccatctgt cttcatcttc   420
ccgccatctg atgagcagtt gaaatctgga actgcctctg ttgtgtgcct gctgaataac   480
ttctatccca gagaggccaa agtacagtgg aaggtggata acgccctcca atcgggtaac   540
tcccaggaga gtgtcacaga gcaggacagc aaggacagca cctacagcct cagcagcacc   600
ctgacgctga gcaaagcaga ctacgagaaa cacaaagtct acgcctgcga agtcacccat   660
cagggcctga gctcgcccgt cacaaagagc ttcaacaggg gagagtgt              708

SEQ ID NO: 26           moltype = DNA  length = 33
FEATURE                 Location/Qualifiers
misc_feature            1..33
                        note = 7F11 light chain 2 CDR1 DNA sequence
source                  1..33
                        mol_type = other DNA
                        organism = synthetic construct
SEQUENCE: 26
cgggcgagtc agggtattag cagctggtta gcc                                33

SEQ ID NO: 27           moltype = DNA  length = 21
FEATURE                 Location/Qualifiers
misc_feature            1..21
                        note = 7F11 light chain 2 CDR2 DNA sequence
source                  1..21
                        mol_type = other DNA
                        organism = synthetic construct
SEQUENCE: 27
gctgcatcca gtttgcaaag t                                             21

SEQ ID NO: 28           moltype = DNA  length = 21
FEATURE                 Location/Qualifiers
misc_feature            1..21
                        note = 7F11 light chain 2 CDR3 DNA sequence
source                  1..21
                        mol_type = other DNA
                        organism = synthetic construct
```

```
SEQUENCE: 28
caacagtata atagttaccc t                                             21

SEQ ID NO: 29           moltype = DNA  length = 315
FEATURE                 Location/Qualifiers
misc_feature            1..315
                        note = 7F11 light chain 2 frame work DNA sequence
source                  1..315
                        mol_type = other DNA
                        organism = synthetic construct
SEQUENCE: 29
gacatccaga tgacccagtc tccatcctca ctgtctgcat ctgtaggaga cagagtcacc    60
atcacttgtc gggcgagtca gggtattagc agctggttag cctggtatca gcagaaacca  120
gagaaagccc ctaagtccct gatctatgct gcatccagtt tgcaaagtgg ggtcccatca  180
aggttcagcg gcagtggatc tgggacagat tcactctca ccatcagcag cctgcagcct   240
gaagattttg caacttatta ctgccaacag tataatagtt accctttcgg cggagggacc  300
aaggtggaga tcaaa                                                   315

SEQ ID NO: 30           moltype = DNA  length = 702
FEATURE                 Location/Qualifiers
misc_feature            1..702
                        note = 7F11 light chain 2 full length DNA sequence
source                  1..702
                        mol_type = other DNA
                        organism = synthetic construct
SEQUENCE: 30
atggacatga gggtcctcgc tcagctcctg gggctcctgc tgctctgttt cccaggtgcc    60
agatgtgaca tccagatgac ccagtctcca cctcactgt ctgcatctgt aggagacaga   120
gtcaccatca cttgtcgggc gagtcagggt attagcagct ggttagcctg gtatcagcag  180
aaaccagaga aagcccctaa gtccctgatc tatgctgcat ccagtttgca aagtggggtc  240
ccatcaaggt tcagcggcag tggatctggg acagatttca ctctcaccat cagcagcctg  300
cagcctgaag attttgcaac ttattactgc caacagtata atagttaccc tttcggcgga  360
gggaccaagg tggagatcaa acgaactgtg gctgcaccat ctgtcttcat cttcccgcca  420
tctgatgagc agttgaaatc tggaactgcc tctgttgtgt gcctgctgaa taacttctat  480
cccagaggcc aaaagtaca gtggaaggtg gataacgccc tccaatcggg taactcccag  540
gagagtgtca cagagcagga cagcaaggac agcacctaca gcctcagcag caccctgacg  600
ctgagcaaag cagactacga gaaacacaaa gtctacgcct gcgaagtcac ccatcagggc  660
ctgagctcgc ccgtcacaaa gagcttcaac aggggagagt gt                     702

SEQ ID NO: 31           moltype = AA  length = 5
FEATURE                 Location/Qualifiers
REGION                  1..5
                        note = 18E8 heavy chain CDR1 amino acid sequence
source                  1..5
                        mol_type = protein
                        organism = synthetic construct
SEQUENCE: 31
SYSMN                                                                5

SEQ ID NO: 32           moltype = AA  length = 17
FEATURE                 Location/Qualifiers
REGION                  1..17
                        note = 18E8 heavy chain CDR2 amino acid sequence
source                  1..17
                        mol_type = protein
                        organism = synthetic construct
SEQUENCE: 32
FISSWSNYIY YADSVKG                                                  17

SEQ ID NO: 33           moltype = AA  length = 10
FEATURE                 Location/Qualifiers
REGION                  1..10
                        note = 18E8 heavy chain CDR3 amino acid sequence
source                  1..10
                        mol_type = protein
                        organism = synthetic construct
SEQUENCE: 33
LANWGTYFDC                                                          10

SEQ ID NO: 34           moltype = AA  length = 119
FEATURE                 Location/Qualifiers
REGION                  1..119
                        note = 18E8 heavy chain frame work amino acid sequence
source                  1..119
                        mol_type = protein
                        organism = synthetic construct
SEQUENCE: 34
EVQLVESGGG LVKPGGSLKL SCAASGFTFS SYSMNWVRQA PGKGLEWVSF ISSWSNYIYY    60
ADSVKGRFTI SRDNAKNSLY LQMNSLRAED TAVYYCASLA NWGTYFDCWG QGTLVTVSS   119
```

```
SEQ ID NO: 35          moltype = AA  length = 468
FEATURE                Location/Qualifiers
REGION                 1..468
                       note = 18E8 heavy chain full length amino acid sequence
source                 1..468
                       mol_type = protein
                       organism = synthetic construct
SEQUENCE: 35
MELGLRWVFL VAILEGVQCE VQLVESGGGL VKPGGSLKLS CAASGFTFSS YSMNWVRQAP   60
GKGLEWVSFI SSWSNYIYYA DSVKGRFTIS RDNAKNSLYL QMNSLRAEDT AVYYCASLAN  120
WGTYFDCWGQ GTLVTVSSAS TKGPSVFPLA PSSKSTSGGT AALGCLVKDY FPEPVTVSWN  180
SGALTSGVHT FPAVLQSSGL YSLSSVVTVP SSSLGTQTYI CNVNHKPSNT KVDKRVEPKS  240
CDKTHTCPPC PAPELLGGPS VFLFPPKPKD TLMISRTPEV TCVVVDVSHE DPEVKFNWYV  300
DGVEVHNAKT KPREEQYNST YRVVSVLTVL HQDWLNGKEY KCKVSNKALP APIEKTISKA  360
KGQPREPQVY TLPPSRDELT KNQVSLTCLV KGFYPSDIAV EWESNGQPEN NYKTTPPVLD  420
SDGSFFLYSK LTVDKSRWQQ GNVFSCSVMH EALHNHYTQK SLSLSPGK              468

SEQ ID NO: 36          moltype = AA  length = 11
FEATURE                Location/Qualifiers
REGION                 1..11
                       note = 18E8 light chain 1 CDR1 amino acid sequence
source                 1..11
                       mol_type = protein
                       organism = synthetic construct
SEQUENCE: 36
RASQGISSWL A                                                       11

SEQ ID NO: 37          moltype = AA  length = 7
FEATURE                Location/Qualifiers
REGION                 1..7
                       note = 18E8 light chain 1 CDR2 amino acid sequence
source                 1..7
                       mol_type = protein
                       organism = synthetic construct
SEQUENCE: 37
AASSLQS                                                            7

SEQ ID NO: 38          moltype = AA  length = 9
FEATURE                Location/Qualifiers
REGION                 1..9
                       note = 18E8 light chain 1 CDR3 amino acid sequence
source                 1..9
                       mol_type = protein
                       organism = synthetic construct
SEQUENCE: 38
QQYNSYPLT                                                          9

SEQ ID NO: 39          moltype = AA  length = 107
FEATURE                Location/Qualifiers
REGION                 1..107
                       note = 18E8 light chain 1 frame work amino acid sequence
source                 1..107
                       mol_type = protein
                       organism = synthetic construct
SEQUENCE: 39
DIQMTQSPSS LSASVGDRVT ITCRASQGIS SWLAWYQQKP EKAPKSLIYA ASSLQSGVPS   60
RFSGSGSGTD FTLTISSLQP EDFATYYCQQ YNSYPLTFGG GTKVEIK                107

SEQ ID NO: 40          moltype = AA  length = 236
FEATURE                Location/Qualifiers
REGION                 1..236
                       note = 18E8 light chain 1 full length amino acid sequence
source                 1..236
                       mol_type = protein
                       organism = synthetic construct
SEQUENCE: 40
MDMRVLAQLL GLLLLCFPGA RCDIQMTQSP SSLSASVGDR VTITCRASQG ISSWLAWYQQ   60
KPEKAPKSLI YAASSLQSGV PSRFSGSGSG TDFTLTISSL QPEDFATYYC QQYNSYPLTF  120
GGGTKVEIKR TVAAPSVFIF PPSDEQLKSG TASVVCLLNN FYPREAKVQW KVDNALQSGN  180
SQESVTEQDS KDSTYSLSST LTLSKADYEK HKVYACEVTH QGLSSPVTKS FNRGEC      236

SEQ ID NO: 41          moltype = AA  length = 11
FEATURE                Location/Qualifiers
REGION                 1..11
                       note = 18E8 light chain 2 CDR1 amino acid sequence
source                 1..11
                       mol_type = protein
                       organism = synthetic construct
```

```
SEQUENCE: 41
WASQGISSYL A                                                              11

SEQ ID NO: 42           moltype = AA   length = 7
FEATURE                 Location/Qualifiers
REGION                  1..7
                        note = 18E8 light chain 2 CDR2 amino acid sequence
source                  1..7
                        mol_type = protein
                        organism = synthetic construct
SEQUENCE: 42
FASSLQS                                                                   7

SEQ ID NO: 43           moltype = AA   length = 9
FEATURE                 Location/Qualifiers
REGION                  1..9
                        note = 18E8 light chain 2 CDR3 amino acid sequence
source                  1..9
                        mol_type = protein
                        organism = synthetic construct
SEQUENCE: 43
QQYYSTPLT                                                                 9

SEQ ID NO: 44           moltype = AA   length = 107
FEATURE                 Location/Qualifiers
REGION                  1..107
                        note = 18E8 light chain 2 frame work amino acid sequence
source                  1..107
                        mol_type = protein
                        organism = synthetic construct
SEQUENCE: 44
AIRMTQSPFS LSASVGDRVT ITCWASQGIS SYLAWYQQNP AKAPKLFIYF ASSLQSGVPS          60
RFSGSGSGTD YTLTISSLQP EDFATYSCQQ YYSTPLTFGG GTKVEIK                       107

SEQ ID NO: 45           moltype = AA   length = 236
FEATURE                 Location/Qualifiers
REGION                  1..236
                        note = 18E8 light chain 2 full length amino acid sequence
source                  1..236
                        mol_type = protein
                        organism = synthetic construct
SEQUENCE: 45
MDMRVPAQRL GLLLLWFPGA RCAIRMTQSP FSLSASVGDR VTITCWASQG ISSYLAWYQQ          60
NPAKAPKLFI YFASSLQSGV PSRFSGSGSG TDYTLTISSL QPEDFATYSC QQYYSTPLTF         120
GGGTKVEIKR TVAAPSVFIF PPSDEQLKSG TASVVCLLNN FYPREAKVQW KVDNALQSGN         180
SQESVTEQDS KDSTYSLSST LTLSKADYEK HKVYACEVTH QGLSSPVTKS FNRGEC             236

SEQ ID NO: 46           moltype = DNA   length = 15
FEATURE                 Location/Qualifiers
misc_feature            1..15
                        note = 18E8 heavy chain CDR1 DNA sequence
source                  1..15
                        mol_type = other DNA
                        organism = synthetic construct
SEQUENCE: 46
agctatagca tgaac                                                          15

SEQ ID NO: 47           moltype = DNA   length = 51
FEATURE                 Location/Qualifiers
misc_feature            1..51
                        note = 18E8 heavy chain CDR2 DNA sequence
source                  1..51
                        mol_type = other DNA
                        organism = synthetic construct
SEQUENCE: 47
ttcattagta gttggagtaa ttacatatac tacgcagact cagtgaaggg c                  51

SEQ ID NO: 48           moltype = DNA   length = 30
FEATURE                 Location/Qualifiers
misc_feature            1..30
                        note = 18E8 heavy chain CDR3 DNA sequence
source                  1..30
                        mol_type = other DNA
                        organism = synthetic construct
SEQUENCE: 48
ctagctaact ggggaaccta ctttgactgc                                          30

SEQ ID NO: 49           moltype = DNA   length = 357
FEATURE                 Location/Qualifiers
```

| | |
|---|---|
| misc_feature | 1..357<br>note = 18E8 heavy chain frame work DNA sequence |
| source | 1..357<br>mol_type = other DNA<br>organism = synthetic construct |

SEQUENCE: 49

```
gaggtgcagc tggtggagtc tgggggaggc ctggtcaagc ctgggggtc cctgaaactc    60
tcctgtgcag cctctggatt caccttcagt agctatagca tgaactgggt ccgccaggct   120
ccagggaagg ggctggagtg ggtctcattc attagtagtt ggagtaatta catatactac   180
gcagactcag tgaagggccg attcaccatc tccagagaca acgccaagaa ctcactgtat   240
ctgcaaatga acagcctgag agccgaggac acggctgtgt attactgtgc gagcctagct   300
aactggggaa cctactttga ctgctggggc cagggaaccc tggtcaccgt ctcgtca     357
```

| SEQ ID NO: 50 | moltype = DNA  length = 1404 |
|---|---|
| FEATURE | Location/Qualifiers |
| misc_feature | 1..1404<br>note = 18E8 heavy chain full length DNA sequence |
| source | 1..1404<br>mol_type = other DNA<br>organism = synthetic construct |

SEQUENCE: 50

```
atggaactgg ggctccgctg ggttttcctt gttgctattt tagaaggtgt ccagtgtgag    60
gtgcagctgg tggagtctgg gggaggcctg gtcaagcctg ggggtccct gaaactctcc   120
tgtgcagcct ctggattcac cttcagtagc tatagcatga actgggtccg ccaggctcca   180
gggaagggc tggagtgggt ctcattcatt agtagttgga gtaattacat atactacgca   240
gactcagtga agggccgatt caccatctcc agagacaacg ccaagaactc actgtatctg   300
caaatgaaca gcctgagagc cgaggacacg gctgtgtatt actgtgcgag cctagctaac   360
tggggaacct actttgactg ctggggccag ggaaccctgg tcaccgtctc gcagcctcc   420
accaagggcc catcggtctt ccccctggca ccctcctcca agagcacctc tgggggcaca   480
gcggccctgg gctgcctggt caaggactac ttccccgaac cggtgacggt gtcgtggaac   540
tcaggcgccc tgaccagcgg cgtgcacacc ttcccggctg tcctacagtc ctcaggactc   600
tactccctca gcagcgtggt gaccgtgccc tccagcagct tgggcaccca gacctacatc   660
tgcaacgtga atcacaagcc cagcaacacc aaggtggaca gagagttga gcccaaatct   720
tgtgacaaaa ctcacacatg cccaccgtgc ccagcaacct aactcctggg gggaccgtca   780
gtcttcctct tccccccaaa acccaaggac accctcatga tctcccggac ccctgaggtc   840
acatgcgtgg tggtggacgt gagccacgaa gaccctgagg tcaagttcaa ctggtacgtg   900
gacggcgtga aggtgcataa tgccaagaca aagccgcggg aggagcagta caacagcacg   960
taccgtgtgg tcagcgtcct caccgtcctg caccaggact ggctgaatgg caaggagtac  1020
aagtgcaagg tctccaacaa agccctccca gcccccatcg agaaaaccat ctccaaagcc  1080
aaagggcagc ccgagaacc acaggtgtac accctgcccc catcccggga tgagctgacc  1140
aagaaccagg tcagcctgac ctgcctggtc aaaggcttct atcccagcga catcgccgtg  1200
gagtgggaga gcaatgggca gccggagaac aactacaaga ccacgcctcc cgtgctggac  1260
tccgacggct ccttcttcct ctacagcaag ctcaccgtgg acaagagcag gtggcagcag  1320
gggaacgtct tctcatgctc cgtgatgcat gaggctctgc acaaccacta cacgcagaag  1380
agcctctccc tgtctccggg taaa                                          1404
```

| SEQ ID NO: 51 | moltype = DNA  length = 33 |
|---|---|
| FEATURE | Location/Qualifiers |
| misc_feature | 1..33<br>note = 18E8 light chain 1 CDR1 DNA sequence |
| source | 1..33<br>mol_type = other DNA<br>organism = synthetic construct |

SEQUENCE: 51

```
cgggcgagtc agggtattag cagctggtta gcc                                 33
```

| SEQ ID NO: 52 | moltype = DNA  length = 21 |
|---|---|
| FEATURE | Location/Qualifiers |
| misc_feature | 1..21<br>note = 18E8 light chain 1 CDR2 DNA sequence |
| source | 1..21<br>mol_type = other DNA<br>organism = synthetic construct |

SEQUENCE: 52

```
gctgcatcca gtttgcaaag t                                              21
```

| SEQ ID NO: 53 | moltype = DNA  length = 27 |
|---|---|
| FEATURE | Location/Qualifiers |
| misc_feature | 1..27<br>note = 18E8 light chain 1 CDR3 DNA sequence |
| source | 1..27<br>mol_type = other DNA<br>organism = synthetic construct |

SEQUENCE: 53

```
caacagtata atagttaccc gctcact                                        27
```

| SEQ ID NO: 54 | moltype = DNA  length = 321 |
|---|---|
| FEATURE | Location/Qualifiers |
| misc_feature | 1..321 |

```
                        note = 18E8 light chain 1 frame work DNA sequence
source                  1..321
                        mol_type = other DNA
                        organism = synthetic construct
SEQUENCE: 54
gacatccaga tgacccagtc tccatcctca ctgtctgcat ctgtaggaga cagagtcacc    60
atcacttgtc gggcgagtca gggtattagc agctggttag cctggtatca gcagaaacca   120
gagaaagccc ctaagtccct gatctatgct gcatccagtt tgcaaagtgg ggtcccatca   180
aggttcagcg gcagtggatc tgggacagat ttcactctca ccatcagcag cctgcagcct   240
gaagattttg caacttatta ctgccaacag tataatagtt acccgctcac tttcggcgga   300
gggaccaagg tggagatcaa a                                             321

SEQ ID NO: 55           moltype = DNA  length = 708
FEATURE                 Location/Qualifiers
misc_feature            1..708
                        note = 18E8 light chain 1 full length DNA sequence
source                  1..708
                        mol_type = other DNA
                        organism = synthetic construct
SEQUENCE: 55
atggacatga gggtcctcgc tcagctcctg gggctcctgc tgctctgttt cccaggtgcc    60
agatgtgaca tccagatgac ccagtctcca tcctcactgt ctgcatctgt aggagacaga   120
gtcaccatca cttgtcgggc gagtcagggt attagcagct ggttagcctg gtatcagcag   180
aaaccagaga aagcccctaa gtccctgatc tatgctgcat ccagtttgca aagtggggtc   240
ccatcaaggt tcagcggcag tggatctggg acagatttca ctctcaccat cagcagcctg   300
cagcctgaag attttgcaac ttattactgc caacagtata ataccgctca ctttc       360
ggcggaggga ccaaggtgga gatcaaacga actgtggctg caccatctgt cttcatcttc   420
ccgccatctg atgagcagtt gaaatctgga actgcctctg ttgtgtgcct gctgaataac   480
ttctatccca gagaggccaa agtacagtgg aaggtggata acgccctcca atcgggtaac   540
tcccaggaga gtgtcacaga gcaggacagc aaggacagca cctacagcct cagcagcacc   600
ctgacgctga gcaaagcaga ctacgagaaa cacaaagtct acgcctgcga agtcacccat   660
cagggcctga gctcgcccgt cacaaagagc ttcaacaggg gagagtgt                708

SEQ ID NO: 56           moltype = DNA  length = 33
FEATURE                 Location/Qualifiers
misc_feature            1..33
                        note = 18E8 light chain 2 CDR1 DNA sequence
source                  1..33
                        mol_type = other DNA
                        organism = synthetic construct
SEQUENCE: 56
tgggccagtc agggcattag cagttattta gcc                                 33

SEQ ID NO: 57           moltype = DNA  length = 21
FEATURE                 Location/Qualifiers
misc_feature            1..21
                        note = 18E8 light chain 2 CDR2 DNA sequence
source                  1..21
                        mol_type = other DNA
                        organism = synthetic construct
SEQUENCE: 57
tttgcatcca gtttgcaaag t                                              21

SEQ ID NO: 58           moltype = DNA  length = 27
FEATURE                 Location/Qualifiers
misc_feature            1..27
                        note = 18E8 light chain 2 CDR3 DNA sequence
source                  1..27
                        mol_type = other DNA
                        organism = synthetic construct
SEQUENCE: 58
caacagtatt atagtacccc gctcact                                        27

SEQ ID NO: 59           moltype = DNA  length = 321
FEATURE                 Location/Qualifiers
misc_feature            1..321
                        note = 18E8 light chain 2 frame work DNA sequence
source                  1..321
                        mol_type = other DNA
                        organism = synthetic construct
SEQUENCE: 59
gccatccgga tgacccagtc tccattctcc ctgtctgcat ctgtaggaga cagagtcacc    60
atcacttgct gggccagtca gggcattagc agttatttag cctggtatca gcaaaatcca   120
gcaaaagccc ctaagtctct catctatttt gcatccagtt tgcaaagtgg ggtcccatca   180
aggttcagcg gcagtggatc tgggacggat tacactctca ccatcagcag cctgcagcct   240
gaagattttg caacttattc ctgtcaacag tattatagta cccccgctcac tttcggcgga   300
gggaccaagg tggagatcaa a                                             321

SEQ ID NO: 60           moltype = DNA  length = 708
```

```
FEATURE                 Location/Qualifiers
misc_feature            1..708
                        note = 18E8 light chain 2 full length DNA sequence
source                  1..708
                        mol_type = other DNA
                        organism = synthetic construct
SEQUENCE: 60
atggacatga gggtgcccgc tcagcgcctg gggctcctgc tgctctggtt cccaggtgcc    60
agatgtgcca tccggatgac ccagtctcca ttctccctgt ctgcatctgt aggagacaga   120
gtcaccatca cttgctgggc cagtcagggc attagcagtt atttagcctg gtatcagcaa   180
aatccagcaa aagcccctaa gctcttcatc tattttgcat ccagtttgca aagtggggtc   240
ccatcaaggt tcagcggcag tggatctggg acggattaca ctctcaccat cagcagcctg   300
cagcctgaag attttgcaac ttattcctgt caacagtatt atagtacccc gctcactttc   360
ggcggaggga ccaaggtgga gatcaaacga actgtggctg caccatctgt cttcatcttc   420
ccgccatctg atgagcagtt gaaatctgga actgcctctg ttgtgtgcct gctgaataac   480
ttctatccca gagaggccaa agtacagtgg aaggtggata acgccctcca atcgggtaac   540
tcccaggaga gtgtcacaga gcaggacagc aaggacagca cctacagcct cagcagcacc   600
ctgacgctga gcaaagcaga ctacgagaaa cacaaagtct acgcctgcga agtcacccat   660
cagggcctga gctcgcccgt cacaaagagc ttcaacaggg gagagtgt              708

SEQ ID NO: 61           moltype = AA  length = 5
FEATURE                 Location/Qualifiers
REGION                  1..5
                        note = 10B3 heavy chain CDR1 amino acid sequence
source                  1..5
                        mol_type = protein
                        organism = synthetic construct
SEQUENCE: 61
SYSMN                                                                 5

SEQ ID NO: 62           moltype = AA  length = 17
FEATURE                 Location/Qualifiers
REGION                  1..17
                        note = 10B3 heavy chain CDR2 amino acid sequence
source                  1..17
                        mol_type = protein
                        organism = synthetic construct
SEQUENCE: 62
FISSNRNYIY YADSVKG                                                   17

SEQ ID NO: 63           moltype = AA  length = 10
FEATURE                 Location/Qualifiers
REGION                  1..10
                        note = 10B3 heavy chain CDR3 amino acid sequence
source                  1..10
                        mol_type = protein
                        organism = synthetic construct
SEQUENCE: 63
LANWGTYFDY                                                           10

SEQ ID NO: 64           moltype = AA  length = 119
FEATURE                 Location/Qualifiers
REGION                  1..119
                        note = 10B3 heavy chain frame work amino acid sequence
source                  1..119
                        mol_type = protein
                        organism = synthetic construct
SEQUENCE: 64
EVQLVESGGG LVKPGGSLRL SCAASGFTFS SYSMNWVRQA PGKGLEWVSF ISSNRNYIYY    60
ADSVKGRFTI SRDNAKNSLY LQMNSLRAED TAVYYCASLA NWGTYFDYWG QGTLVTVSS    119

SEQ ID NO: 65           moltype = AA  length = 468
FEATURE                 Location/Qualifiers
REGION                  1..468
                        note = 10B3 heavy chain full length amino acid sequence
source                  1..468
                        mol_type = protein
                        organism = synthetic construct
SEQUENCE: 65
MELGLRWVFL VAILEGVQCE VQLVESGGGL VKPGGSLRLS CAASGFTFSS YSMNWVRQAP    60
GKGLEWVSFI SSNRNYIYYA DSVKGRFTIS RDNAKNSLYL QMNSLRAEDT AVYYCASLAN   120
WGTYFDYWGQ GTLVTVSSAS TKGPSVFPLA PSSKSTSGGT AALGCLVKDY FPEPVTVSWN   180
SGALTSGVHT FPAVLQSSGL YSLSSVVTVP SSSLGTQTYI CNVNHKPSNT KVDKRVEPKS   240
CDKTHTCPPC PAPELLGGPS VFLFPPKPKD TLMISRTPEV TCVVVDVSHE DPEVKFNWYV   300
DGVEVHNAKT KPREEQYNST YRVVSVLTVL HQDWLNGKEY KCKVSNKALP APIEKTISKA   360
KGQPREPQVY TLPPSRDELT KNQVSLTCLV KGFYPSDIAV EWESNGQPEN NYKTTPPVLD   420
SDGSFFLYSK LTVDKSRWQQ GNVFSCSVMH EALHNHYTQK SLSLSPGK               468

SEQ ID NO: 66           moltype = AA  length = 11
```

| FEATURE | Location/Qualifiers |
|---|---|
| REGION | 1..11 |
| | note = 10B3 light chain 1 CDR1 amino acid sequence |
| source | 1..11 |
| | mol_type = protein |
| | organism = synthetic construct |

SEQUENCE: 66
RASQGISSWL A                                                                                      11

| SEQ ID NO: 67 | moltype = AA   length = 7 |
|---|---|
| FEATURE | Location/Qualifiers |
| REGION | 1..7 |
| | note = 10B3 light chain 1 CDR2 amino acid sequence |
| source | 1..7 |
| | mol_type = protein |
| | organism = synthetic construct |

SEQUENCE: 67
AASSLQS                                                                                            7

| SEQ ID NO: 68 | moltype = AA   length = 9 |
|---|---|
| FEATURE | Location/Qualifiers |
| REGION | 1..9 |
| | note = 10B3 light chain 1 CDR3 amino acid sequence |
| source | 1..9 |
| | mol_type = protein |
| | organism = synthetic construct |

SEQUENCE: 68
RQYNSYPLT                                                                                          9

| SEQ ID NO: 69 | moltype = AA   length = 107 |
|---|---|
| FEATURE | Location/Qualifiers |
| REGION | 1..107 |
| | note = 10B3 light chain 1 frame work amino acid sequence |
| source | 1..107 |
| | mol_type = protein |
| | organism = synthetic construct |

SEQUENCE: 69
DIQMTQSPSS LSASVGDRVT ITCRASQGIS SWLAWYQQKP EKAPKSLIYA ASSLQSGVPS   60
RFSGSGSGTD FTLTISSLQP EDFATYYCRQ YNSYPLTFGG GTKVEIR              107

| SEQ ID NO: 70 | moltype = AA   length = 236 |
|---|---|
| FEATURE | Location/Qualifiers |
| REGION | 1..236 |
| | note = 10B3 light chain 1 full length amino acid sequence |
| source | 1..236 |
| | mol_type = protein |
| | organism = synthetic construct |

SEQUENCE: 70
MDMRVLAQLL GLLLLCFPGA RCDIQMTQSP SSLSASVGDR VTITCRASQG ISSWLAWYQQ   60
KPEKAPKSLI YAASSLQSGV PSRFSGSGSG TDFTLTISSL QPEDFATYYC RQYNSYPLTF  120
GGGTKVEIRR TVAAPSVFIF PPSDEQLKSG TASVVCLLNN FYPREAKVQW KVDNALQSGN  180
SQESVTEQDS KDSTYSLSST LTLSKADYEK HKVYACEVTH QGLSSPVTKS FNRGEC      236

| SEQ ID NO: 71 | moltype = AA   length = 11 |
|---|---|
| FEATURE | Location/Qualifiers |
| REGION | 1..11 |
| | note = 10B3 light chain 2 CDR1 amino acid sequence |
| source | 1..11 |
| | mol_type = protein |
| | organism = synthetic construct |

SEQUENCE: 71
WASQGISSYL A                                                                                      11

| SEQ ID NO: 72 | moltype = AA   length = 7 |
|---|---|
| FEATURE | Location/Qualifiers |
| REGION | 1..7 |
| | note = 10B3 light chain 2 CDR2 amino acid sequence |
| source | 1..7 |
| | mol_type = protein |
| | organism = synthetic construct |

SEQUENCE: 72
YASSLQS                                                                                            7

| SEQ ID NO: 73 | moltype = AA   length = 9 |
|---|---|
| FEATURE | Location/Qualifiers |
| REGION | 1..9 |
| | note = 10B3 light chain 2 CDR3 amino acid sequence |
| source | 1..9 |
| | mol_type = protein |

```
                          organism = synthetic construct
SEQUENCE: 73
QQYYSTPLT                                                                    9

SEQ ID NO: 74             moltype = AA   length = 107
FEATURE                   Location/Qualifiers
REGION                    1..107
                          note = 10B3 light chain 2 frame work amino acid sequence
source                    1..107
                          mol_type = protein
                          organism = synthetic construct
SEQUENCE: 74
AIRMTQSPFS LSASVGDRVT ITCWASQGIS SYLAWYQQKP AKAPNLFIYY ASSLQSGVPS              60
RFSGSGSGTD YTLTISSLQP EDFATYYCQQ YYSTPLTFGG GTKVEIK                          107

SEQ ID NO: 75             moltype = AA   length = 236
FEATURE                   Location/Qualifiers
REGION                    1..236
                          note = 10B3 light chain 2 full length amino acid sequence
source                    1..236
                          mol_type = protein
                          organism = synthetic construct
SEQUENCE: 75
MDMRVPAQRL GLLLLWFPGA RCAIRMTQSP FSLSASVGDR VTITCWASQG ISSYLAWYQQ              60
KPAKAPNLFI YYASSLQSGV PSRFSGSGSG TDYTLTISSL QPEDFATYYC QQYYSTPLTF             120
GGGTKVEIKR TVAAPSVFIF PPSDEQLKSG TASVVCLLNN FYPREAKVQW KVDNALQSGN             180
SQESVTEQDS KDSTYSLSST LTLSKADYEK HKVYACEVTH QGLSSPVTKS FNRGEC                 236

SEQ ID NO: 76             moltype = DNA   length = 15
FEATURE                   Location/Qualifiers
misc_feature              1..15
                          note = 10B3 heavy chain CDR1 DNA sequence
source                    1..15
                          mol_type = other DNA
                          organism = synthetic construct
SEQUENCE: 76
agctatagca tgaac                                                             15

SEQ ID NO: 77             moltype = DNA   length = 51
FEATURE                   Location/Qualifiers
misc_feature              1..51
                          note = 10B3 heavy chain CDR2 DNA sequence
source                    1..51
                          mol_type = other DNA
                          organism = synthetic construct
SEQUENCE: 77
ttcattagta gtaatcgtaa ttacatatac tacgcagact cagtgaaggg c                      51

SEQ ID NO: 78             moltype = DNA   length = 30
FEATURE                   Location/Qualifiers
misc_feature              1..30
                          note = 10B3 heavy chain CDR3 DNA sequence
source                    1..30
                          mol_type = other DNA
                          organism = synthetic construct
SEQUENCE: 78
ctagctaact ggggaaccta ctttgactac                                              30

SEQ ID NO: 79             moltype = DNA   length = 357
FEATURE                   Location/Qualifiers
misc_feature              1..357
                          note = 10B3 heavy chain frame work DNA sequence
source                    1..357
                          mol_type = other DNA
                          organism = synthetic construct
SEQUENCE: 79
gaggtgcagc tggtggagtc tgggggaggc ctggtcaagc ctgggggtc cctgagactc              60
tcctgtgcag cctctggatt cacccttcagt agctatagca tgaactgggt ccgccaggct           120
ccagggaagg gctggagtg gtctcattc attagtagta atcgtaatta catatactac              180
gcagactcag tgaagggccg attcaccatc tccagagaca acgccaagaa ctcactgtat            240
ctgcaaatga acagcctgag agccgaggac acggctgtgt attactgtgc gagcctagct            300
aactggggaa cctactttga ctactggggc caggaaccc tggtcaccgt ctcctca                357

SEQ ID NO: 80             moltype = DNA   length = 1404
FEATURE                   Location/Qualifiers
misc_feature              1..1404
                          note = 10B3 heavy chain full length DNA sequence
source                    1..1404
                          mol_type = other DNA
```

```
                  organism = synthetic construct
SEQUENCE: 80
atggaactgg ggctccgctg ggttttcctt gttgctattt tagaaggtgt ccagtgtgag   60
gtgcagctgg tggagtctgg gggaggcctg gtcaagcctg gggggtccct gagactctcc  120
tgtgcagcct ctggattcac cttcagtagc tatagcatga ctgggtccgc ccaggctcca  180
gggaaggggc tggagtgggt ctcattcatt agtagtaatc gtaattacat atactacgca  240
gactcagtga agggccgatt caccatctcc agagacaacg ccaagaactc actgtatctg  300
caaatgaaca gcctgagagc cgaggacacg gctgtgtatt actgtgcgag cctagctaac  360
tggggaacct actttgacta ctggggccag gaacctgtca ccgtctcc  ctcagcctcc  420
accaagggcc catcggtctt ccccctggca ccctcctcca agagcacctc tgggggcaca  480
gcggccctgg gctgcctggt caaggactac ttccccgaac cggtgacggt gtcgtggaac  540
tcaggcgccc tgaccagcgg cgtgcacacc ttcccggctg tcctacagtc ctcaggactc  600
tactccctca gcagcgtggt gaccgtgccc tccagcagct tgggcaccca gacctacatc  660
tgcaacgtga atcacaagcc cagcaacacc aaggtggaca gagagttga gcccaaatct  720
tgtgacaaaa ctcacacatg cccaccgtgc ccagcacctg aactcctggg gggaccgtca  780
gtcttcctct tccccccaaa acccaaggac accctcatga tctcccggac ccctgaggtc  840
acatgcgtgg tggtggacgt gagccacgaa gaccctgagg tcaagttcaa ctggtacgtg  900
gacggcgtgg aggtgcataa tgccaagaca aagccgcggg aggagcagta caacagcacg  960
taccgtgtgg tcagcgtcct caccgtcctg caccaggact ggctgaatgg caaggagtac 1020
aagtgcaagg tctccaacaa agccctccca gcccccatcg agaaaaccat ctccaaagcc 1080
aaagggcagc cccgagaacc acaggtgtac accctgcccc catcccggga tgagctgacc 1140
aagaaccagg tcagcctgac ctgcctggtc aaaggcttct atcccagcga catcgccgtg 1200
gagtgggaga gcaatgggca gccggagaac aactacaaga ccacgcctcc cgtgctggac 1260
tccgacggct ccttcttcct ctacagcaag ctcaccgtgg acaagagcag gtggcagcag 1320
gggaacgtct tctcatgctc cgtgatgcat gaggctctgc acaaccacta cacgcagaag 1380
agcctctccc tgtctccggg taaa                                         1404

SEQ ID NO: 81             moltype = DNA  length = 33
FEATURE                   Location/Qualifiers
misc_feature              1..33
                          note = 10B3 light chain 1 CDR1 DNA sequence
source                    1..33
                          mol_type = other DNA
                          organism = synthetic construct
SEQUENCE: 81
cgggcgagtc agggtattag cagctggtta gcc                                33

SEQ ID NO: 82             moltype = DNA  length = 21
FEATURE                   Location/Qualifiers
misc_feature              1..21
                          note = 10B3 light chain 1 CDR2 DNA sequence
source                    1..21
                          mol_type = other DNA
                          organism = synthetic construct
SEQUENCE: 82
gctgcatcca gtttgcaaag t                                             21

SEQ ID NO: 83             moltype = DNA  length = 27
FEATURE                   Location/Qualifiers
misc_feature              1..27
                          note = 10B3 light chain 1 CDR3 DNA sequence
source                    1..27
                          mol_type = other DNA
                          organism = synthetic construct
SEQUENCE: 83
cgacagtata atagttaccc actcact                                       27

SEQ ID NO: 84             moltype = DNA  length = 321
FEATURE                   Location/Qualifiers
misc_feature              1..321
                          note = 10B3 light chain 1 frame work DNA sequence
source                    1..321
                          mol_type = other DNA
                          organism = synthetic construct
SEQUENCE: 84
gacatccaga tgacccagtc tccatcctca ctgtctgcat ctgtaggaga cagagtcacc   60
atcacttgtc gggcgagtca gggtattagc agctggttag cctggtatca gcagaaacca  120
gagaaagccc ctaagtccct gatctatgct gcatccagtt tgcaaagtgg ggtcccatca  180
aggttcagcg gcagtggatc tgggacagat ttcactctca ccatcagcag cctgcagcct  240
gaagattttg caacttatta ctgccgacag tataatagtt acccactcac tttcggcgga  300
gggaccaagg tggagatcag a                                            321

SEQ ID NO: 85             moltype = DNA  length = 708
FEATURE                   Location/Qualifiers
misc_feature              1..708
                          note = 10B3 light chain 1 full length DNA sequence
source                    1..708
                          mol_type = other DNA
                          organism = synthetic construct
```

```
SEQUENCE: 85
atggacatga gggtcctcgc tcagctcctg gggctcctgc tgctctgttt cccaggtgcc    60
agatgtgaca tccagatgac ccagtctcca tcctcactgt ctgcatctgt aggagacaga   120
gtcaccatca cttgtcgggc gagtcagggt attagcagct ggttagcctg gtatcagcag   180
aaaccagaga aagcccctaa gtccctgatc tatgctgcat ccagtttgca aagtggggtc   240
ccatcaaggt tcagcggcag tggatctggg acagatttca ctctcaccat cagcagcctg   300
cagcctgaag attttgcaac ttattactgc cgacagtata atagttaccc actcactttc   360
ggcggaggga ccaaggtgga gatcagacga actgtggctg caccatctgt cttcatcttc   420
ccgccatctg atgagcagtt gaaatctgga actgcctctg ttgtgtgcct gctgaataac   480
ttctatccca gagaggccaa agtacagtgg aaggtggata acgccctcca atcgggtaac   540
tcccaggaga gtgtcacaga gcaggacagc aaggacagca cctacagcct cagcagcacc   600
ctgacgctga gcaaagcaga ctacgagaaa cacaaagtct acgcctgcga agtcacccat   660
cagggcctga gctcgcccgt cacaaagagc ttcaacaggg gagagtgt              708

SEQ ID NO: 86          moltype = DNA   length = 33
FEATURE                Location/Qualifiers
misc_feature           1..33
                       note = 10B3 light chain 2 CDR1 DNA sequence
source                 1..33
                       mol_type = other DNA
                       organism = synthetic construct
SEQUENCE: 86
tgggccagtc agggcattag cagttattta gcc                                33

SEQ ID NO: 87          moltype = DNA   length = 21
FEATURE                Location/Qualifiers
misc_feature           1..21
                       note = 10B3 light chain 2 CDR2 DNA sequence
source                 1..21
                       mol_type = other DNA
                       organism = synthetic construct
SEQUENCE: 87
tatgcatcca gtttgcaaag t                                             21

SEQ ID NO: 88          moltype = DNA   length = 27
FEATURE                Location/Qualifiers
misc_feature           1..27
                       note = 10B3 light chain 2 CDR3 DNA sequence
source                 1..27
                       mol_type = other DNA
                       organism = synthetic construct
SEQUENCE: 88
caacagtatt atagtacccc gctcact                                       27

SEQ ID NO: 89          moltype = DNA   length = 321
FEATURE                Location/Qualifiers
misc_feature           1..321
                       note = 10B3 light chain 2 frame work DNA sequence
source                 1..321
                       mol_type = other DNA
                       organism = synthetic construct
SEQUENCE: 89
gccatccgga tgacccagtc tccattctcc ctgtctgcat ctgtaggaga cagagtcacc    60
atcacttgct gggccagtca gggcattagc agttatttag cctggtatca gcaaaaacca   120
gcaaaagccc ctaacctctt catctattat gcatccagtt tgcaaagtgg ggtcccatca   180
aggttcagcg gcagtggatc tgggacggat tacactctca ccatcagcag cctgcagcct   240
gaagatttg caacttatta ctgtcaacag tattatagta ccccgctcac tttcggcgga   300
gggaccaagg tggagatcaa a                                             321

SEQ ID NO: 90          moltype = DNA   length = 708
FEATURE                Location/Qualifiers
misc_feature           1..708
                       note = 10B3 light chain 2 full length DNA sequence
source                 1..708
                       mol_type = other DNA
                       organism = synthetic construct
SEQUENCE: 90
atggacatga gggtgcccgc tcagcgcctg gggctcctgc tgctctggtt cccaggtgcc    60
agatgtgcca tccggatgac ccagtctcca ttctccctgt ctgcatctgt aggagacaga   120
gtcaccatca cttgctgggc cagtcagggc attagcagtt atttagcctg gtatcagcaa   180
aaaccagcaa aagcccctaa cctcttcatc tattatgcat ccagtttgca aagtggggtc   240
ccatcaaggt tcagcggcag tggatctggg acggattaca ctctcaccat cagcagcctg   300
cagcctgaag attttgcaac ttattactgt caacagtatt atagtacccc gctcactttc   360
ggcggaggga ccaaggtgga gatcaaacga actgtggctg caccatctgt cttcatcttc   420
ccgccatctg atgagcagtt gaaatctgga actgcctctg ttgtgtgcct gctgaataac   480
ttctatccca gagaggccaa agtacagtgg aaggtggata acgccctcca atcgggtaac   540
tcccaggaga gtgtcacaga gcaggacagc aaggacagca cctacagcct cagcagcacc   600
ctgacgctga gcaaagcaga ctacgagaaa cacaaagtct acgcctgcga agtcacccat   660
cagggcctga gctcgcccgt cacaaagagc ttcaacaggg gagagtgt              708
```

```
SEQ ID NO: 91          moltype = AA  length = 8
FEATURE                Location/Qualifiers
REGION                 1..8
                       note = 4G7 epitope lambda isotype 2 and 3 epitope 1
source                 1..8
                       mol_type = protein
                       organism = synthetic construct
SEQUENCE: 91
KADGSPVK                                                                  8

SEQ ID NO: 92          moltype = AA  length = 8
FEATURE                Location/Qualifiers
REGION                 1..8
                       note = 4G7 epitope lambda isotype 2 and 3 epitope 2
source                 1..8
                       mol_type = protein
                       organism = synthetic construct
SEQUENCE: 92
KADSSPVK                                                                  8

SEQ ID NO: 93          moltype =     length =
SEQUENCE: 93
000

SEQ ID NO: 94          moltype =     length =
SEQUENCE: 94
000
```